(12) United States Patent
Miyasaka

(10) Patent No.: US 7,808,510 B2
(45) Date of Patent: Oct. 5, 2010

(54) IMAGE PROCESSING APPARATUS, IMAGE TRANSMISSION APPARATUS, DISPLAY, IMAGE PROCESSING METHOD, AND IMAGE TRANSMISSION METHOD

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1388 days.

(21) Appl. No.: 11/227,217

(22) Filed: Sep. 16, 2005

(65) Prior Publication Data

US 2006/0061826 A1 Mar. 23, 2006

(30) Foreign Application Priority Data

Sep. 17, 2004 (JP) ............................. 2004-271498

(51) Int. Cl.
*G09G 5/02* (2006.01)
(52) U.S. Cl. ...................... 345/600; 345/596; 345/598; 345/599; 345/605
(58) Field of Classification Search ......... 345/596–600, 345/605, 690, 694–696; 358/3.03–3.06, 358/3.09, 3.1, 3.13–3.19, 3.26; 382/166, 382/237, 275
See application file for complete search history.

(56) References Cited

U.S. PATENT DOCUMENTS

| 5,815,286 | A  | * | 9/1998 | Matsuba et al. ............. 358/3.19 |
| 7,570,824 | B2 | * | 8/2009 | Katougi et al. .............. 382/239 |
| 2004/0061904 | A1 | * | 4/2004 | Bradburn ................... 358/3.06 |

FOREIGN PATENT DOCUMENTS

JP 2003-162272 A 6/2003

OTHER PUBLICATIONS

"The New Image Electron Handbook" (Tokyo, Corona Publishing Co. Ltd., 1993), pp. 41-51.

* cited by examiner

*Primary Examiner*—Amare Mengistu
*Assistant Examiner*—Robert R Rainey
(74) *Attorney, Agent, or Firm*—Sughrue Mion, PLLC

(57) ABSTRACT

An image processing apparatus, an image transmission apparatus, a display, an image processing method and an image transmission method, capable of suppressing tone or gray-level distortion before and after dithering as well as reducing and then increasing the number of bit-planes of an image. An image processing apparatus comprises a first image processor for performing multi-level dithering based on a two-dimensional dither matrix to reduce the bit-plane number of a raster image as an original image, a memory for storing image data of the raster image whose bit-plane number has been reduced by the first image processor, and a second image processor for performing bit addition for the image data read out from the memory to increase the bit-plane number thereof. The first image processor applies to the multi-level dithering the sum of threshold values generated by a threshold generator and offset values generated by an offset generator for minimizing the difference between the signal value of the original image and the average of all the dither values of the raster image whose bit-plane number has been increased. A threshold matrix is obtained by changing matrix values of the two-dimensional dither matrix corresponding to matrix values of an offset matrix not being "0" (zero) to values other than their original values, respectively.

55 Claims, 45 Drawing Sheets

(a) THRESHOLD = $\begin{bmatrix} 0 & 3 & 0 & 3 \\ 2 & 1 & 2 & 1 \\ 0 & 3 & 0 & 3 \\ 2 & 1 & 2 & 1 \end{bmatrix}$ (b) THRESHOLD = $\begin{bmatrix} 0 & 3 & 3 & 2 \\ 2 & 1 & 1 & 0 \\ 3 & 2 & 0 & 3 \\ 1 & 0 & 2 & 1 \end{bmatrix}$   OFFSET = $\begin{bmatrix} 0 & 0 & 1 & 1 \\ 0 & 0 & 1 & 1 \\ 1 & 1 & 0 & 0 \\ 1 & 1 & 0 & 0 \end{bmatrix}$

F I G. 4 PRIOR ART $$\text{INPUT} = \begin{bmatrix} 17 & 17 & 17 & 17 \\ 17 & 17 & 17 & 17 \\ 17 & 17 & 17 & 17 \\ 17 & 17 & 17 & 17 \end{bmatrix} \quad \text{DITHER} = \begin{bmatrix} 0 & 3 & 0 & 3 \\ 2 & 1 & 2 & 1 \\ 0 & 3 & 0 & 3 \\ 2 & 1 & 2 & 1 \end{bmatrix}$$

(OFFSET EXAMPLE 1)

| 0 | 1 | 0 | 1 |
|---|---|---|---|
| 1 | 0 | 1 | 0 |
| 0 | 1 | 0 | 1 |
| 1 | 0 | 1 | 0 |

⇨

OUTPUT (AVERAGE GRAY LEVEL IS 16.5)

| 16 | 15 | 16 | 15 |
|---|---|---|---|
| 18 | 17 | 18 | 17 |
| 16 | 15 | 16 | 15 |
| 18 | 17 | 18 | 17 |

(OFFSET EXAMPLE 2)

| 0 | 0 | 1 | 1 |
|---|---|---|---|
| 0 | 0 | 1 | 1 |
| 1 | 1 | 0 | 0 |
| 1 | 1 | 0 | 0 |

⇨

OUTPUT (AVERAGE GRAY LEVEL IS 17, BUT CYCLIC NOISE IS GENERATED)

| 16 | 19 | 16 | 15 |
|---|---|---|---|
| 18 | 17 | 18 | 17 |
| 16 | 15 | 16 | 19 |
| 18 | 17 | 18 | 17 |

FIG. 7

(a) THRESHOLD = $\begin{bmatrix} 0 & 3 & 0 & 3 \\ 2 & 1 & 2 & 1 \\ 0 & 3 & 0 & 3 \\ 2 & 1 & 2 & 1 \end{bmatrix}$ (b) THRESHOLD = $\begin{bmatrix} 0 & 3 & 3 & 2 \\ 2 & 1 & 1 & 0 \\ 3 & 2 & 0 & 3 \\ 1 & 0 & 2 & 1 \end{bmatrix}$   OFFSET = $\begin{bmatrix} 0 & 0 & 1 & 1 \\ 0 & 0 & 1 & 1 \\ 1 & 1 & 0 & 0 \\ 1 & 1 & 0 & 0 \end{bmatrix}$

F I G. 8

$$\text{THRESHOLD} = \begin{bmatrix} 0 & 3 & 3 & 2 \\ 2 & 1 & 1 & 0 \\ 3 & 2 & 0 & 3 \\ 1 & 0 & 2 & 1 \end{bmatrix} \quad \text{OFFSET} = \begin{bmatrix} 0 & 0 & 1 & 1 \\ 0 & 0 & 1 & 1 \\ 1 & 1 & 0 & 0 \\ 1 & 1 & 0 & 0 \end{bmatrix}$$

$$\text{SUMMATION} = \begin{bmatrix} 0 & 3 & 4 & 3 \\ 2 & 1 & 2 & 1 \\ 4 & 3 & 0 & 3 \\ 2 & 1 & 2 & 1 \end{bmatrix}$$

FIG. 9

$$\text{INPUT} = \begin{bmatrix} 17 & 17 & 17 & 17 \\ 17 & 17 & 17 & 17 \\ 17 & 17 & 17 & 17 \\ 17 & 17 & 17 & 17 \end{bmatrix} \quad \text{MEMORY} = \begin{bmatrix} 4 & 4 & 3 & 4 \\ 4 & 3 & 4 & 4 \\ 4 & 4 & 4 & 4 \\ 4 & 4 & 4 & 4 \end{bmatrix} \quad \text{OUTPUT} = \begin{bmatrix} 16 & 16 & 15 & 18 & 16 & 15 & 17 & 19 & 17 \\ 18 & 19 & 17 & 15 & 17 & 17 & 18 & 16 & 18 \\ 15 & 17 & 18 & 16 & 18 & 17 & 16 & 15 & 17 \\ 17 & 16 & 16 & 18 & 19 & 17 & 18 & 17 & 17 \end{bmatrix}$$

F I G. 10

$$\text{THRESHOLD} = \begin{bmatrix} \begin{array}{|cc|cc|} \hline 0 & 2 & 0 & 2 \\ 3 & 1 & 3 & 1 \\ \hline 0 & 2 & 0 & 2 \\ 3 & 1 & 3 & 1 \\ \hline \end{array} \end{bmatrix}$$

$$\text{THRESHOLD} = \begin{bmatrix} 0 & 2 & 3 & 1 \\ 3 & 1 & 2 & 0 \\ 3 & 1 & 0 & 2 \\ 2 & 0 & 3 & 1 \end{bmatrix} \qquad \text{SUMMATION} = \begin{bmatrix} 0 & 2 & 4 & 2 \\ 3 & 1 & 3 & 1 \\ 4 & 2 & 0 & 2 \\ 3 & 1 & 3 & 1 \end{bmatrix}$$

FIG. 12

| X mod 4 | Y mod 4 | OUTPUT VALUE |
|---------|---------|--------------|
| 00 | 00 | 00 |
| 00 | 01 | 10 |
| 00 | 10 | 11 |
| 00 | 11 | 01 |
| 01 | 00 | 11 |
| 01 | 01 | 01 |
| 01 | 10 | 10 |
| 01 | 11 | 00 |
| 10 | 00 | 11 |
| 10 | 01 | 01 |
| 10 | 10 | 00 |
| 10 | 11 | 10 |
| 11 | 00 | 10 |
| 11 | 01 | 00 |
| 11 | 10 | 11 |
| 11 | 11 | 01 |

F I G. 13

| X mod 4 | Y mod 4 | OUTPUT VALUE |
|---|---|---|
| 00 | 00 | 0 |
| 00 | 01 | 0 |
| 00 | 10 | 1 |
| 00 | 11 | 1 |
| 01 | 00 | 0 |
| 01 | 01 | 0 |
| 01 | 10 | 1 |
| 01 | 11 | 1 |
| 10 | 00 | 1 |
| 10 | 01 | 1 |
| 10 | 10 | 0 |
| 10 | 11 | 0 |
| 11 | 00 | 1 |
| 11 | 01 | 1 |
| 11 | 10 | 0 |
| 11 | 11 | 0 |

F I G. 17

| OFFSET THRESHOLD INPUT | 0 0 | 0 1 | 0 2 | 0 3 | 1 0 | 1 1 | 1 2 | 1 3 | AVERAGE OF OUTPUTS |
|---|---|---|---|---|---|---|---|---|---|
| 0 | 0 | 1 | 2 | 3 | 0 | 1 | 2 | 3 | 1.5 |
| 1 | 0 | 1 | 2 | 3 | 0 | 1 | 2 | 3 | 1.5 |
| 2 | 0 | 1 | 2 | 3 | 0 | 1 | 2 | 3 | 2 |
| 3 | 4 | 5 | 6 | 3 | 4 | 5 | 6 | 3 | 3 |
| 4 | 4 | 5 | 6 | 7 | 4 | 5 | 6 | 7 | 4 |
| 5 | 4 | 5 | 6 | 7 | 4 | 5 | 6 | 7 | 5 |
| 6 | 4 | 5 | 6 | 7 | 4 | 5 | 6 | 7 | 6 |
| 7 | 8 | 9 | 10 | 7 | 8 | 9 | 10 | 7 | 7 |
| 8 | 8 | 9 | 10 | 11 | 8 | 9 | 10 | 11 | 8 |
| 9 | 8 | 9 | 10 | 11 | 8 | 9 | 10 | 11 | 9 |
| 10 | 8 | 9 | 10 | 11 | 8 | 9 | 10 | 11 | 10 |
| 11 | 12 | 13 | 14 | 11 | 12 | 13 | 14 | 11 | 11 |
| 12 | 12 | 13 | 14 | 15 | 12 | 13 | 14 | 15 | 12 |
| 13 | 12 | 13 | 14 | 15 | 12 | 13 | 14 | 15 | 13 |
| 14 | 12 | 13 | 14 | 15 | 12 | 13 | 14 | 15 | 14 |
| 15 | 16 | 17 | 18 | 15 | 16 | 17 | 18 | 15 | 15 |
| 16 | 16 | 17 | 18 | 19 | 16 | 17 | 18 | 19 | 16 |
| 17 | 16 | 17 | 18 | 19 | 16 | 17 | 18 | 19 | 17 |
| 18 | 16 | 17 | 18 | 19 | 16 | 17 | 18 | 19 | 18 |
| 19 | 20 | 21 | 22 | 19 | 20 | 21 | 22 | 19 | 19 |
| 20 | 20 | 21 | 22 | 23 | 20 | 21 | 22 | 23 | 20 |
| 21 | 20 | 21 | 22 | 23 | 20 | 21 | 22 | 23 | 21 |
| 22 | 20 | 21 | 22 | 23 | 20 | 21 | 22 | 23 | 22 |
| 23 | 24 | 25 | 26 | 23 | 24 | 25 | 26 | 23 | 23 |
| 24 | 24 | 25 | 26 | 27 | 24 | 25 | 26 | 27 | 24 |
| 25 | 24 | 25 | 26 | 27 | 24 | 25 | 26 | 27 | 25 |
| 26 | 24 | 25 | 26 | 27 | 24 | 25 | 26 | 27 | 26 |
| 27 | 28 | 29 | 30 | 27 | 28 | 29 | 30 | 27 | 27 |
| 28 | 28 | 29 | 30 | 31 | 28 | 29 | 30 | 31 | 28 |
| 29 | 28 | 29 | 30 | 31 | 28 | 29 | 30 | 31 | 29 |
| 30 | 32 | 29 | 30 | 31 | 28 | 29 | 30 | 31 | 30 |
| 31 | 32 | 33 | 30 | 31 | 32 | 33 | 30 | 31 | 31 |

| OFFSET THRESHOLD INPUT | 0 0 | 0 1 | 0 2 | 0 3 | 1 0 | 1 1 | 1 2 | 1 3 | AVERAGE OF OUTPUTS |
|---|---|---|---|---|---|---|---|---|---|
| 32 | 32 | 33 | 34 | 31 | 32 | 33 | 34 | 31 | 32 |
| 33 | 32 | 33 | 34 | 35 | 32 | 33 | 34 | 35 | 33 |
| 34 | 36 | 33 | 34 | 35 | 36 | 33 | 34 | 35 | 34 |
| 35 | 36 | 37 | 34 | 35 | 36 | 37 | 34 | 35 | 35 |
| 36 | 36 | 37 | 38 | 35 | 36 | 37 | 38 | 35 | 36 |
| 37 | 36 | 37 | 38 | 39 | 36 | 37 | 38 | 39 | 37 |
| 38 | 40 | 37 | 38 | 39 | 40 | 37 | 38 | 39 | 38 |
| 39 | 40 | 41 | 38 | 39 | 40 | 41 | 38 | 39 | 39 |
| 40 | 40 | 41 | 42 | 39 | 40 | 41 | 42 | 39 | 40 |
| 41 | 40 | 41 | 42 | 43 | 40 | 41 | 42 | 43 | 41 |
| 42 | 44 | 41 | 42 | 43 | 44 | 41 | 42 | 43 | 42 |
| 43 | 44 | 45 | 42 | 43 | 44 | 45 | 42 | 43 | 43 |
| 44 | 44 | 45 | 46 | 43 | 44 | 45 | 46 | 43 | 44 |
| 45 | 44 | 45 | 46 | 47 | 44 | 45 | 46 | 47 | 45 |
| 46 | 48 | 45 | 46 | 47 | 48 | 45 | 46 | 47 | 46 |
| 47 | 48 | 49 | 46 | 47 | 48 | 49 | 46 | 47 | 47 |
| 48 | 48 | 49 | 50 | 47 | 48 | 49 | 50 | 47 | 48 |
| 49 | 48 | 49 | 50 | 51 | 48 | 49 | 50 | 51 | 49 |
| 50 | 52 | 49 | 50 | 51 | 52 | 49 | 50 | 51 | 50 |
| 51 | 52 | 53 | 50 | 51 | 52 | 53 | 50 | 51 | 51 |
| 52 | 52 | 53 | 54 | 51 | 52 | 53 | 54 | 51 | 52 |
| 53 | 52 | 53 | 54 | 55 | 52 | 53 | 54 | 55 | 53 |
| 54 | 56 | 53 | 54 | 55 | 56 | 53 | 54 | 55 | 54 |
| 55 | 56 | 57 | 54 | 55 | 56 | 57 | 54 | 55 | 55 |
| 56 | 56 | 57 | 58 | 55 | 56 | 57 | 58 | 55 | 56 |
| 57 | 56 | 57 | 58 | 59 | 56 | 57 | 58 | 59 | 57 |
| 58 | 60 | 57 | 58 | 59 | 60 | 57 | 58 | 59 | 58 |
| 59 | 60 | 61 | 58 | 59 | 60 | 61 | 58 | 59 | 59 |
| 60 | 60 | 61 | 62 | 59 | 60 | 61 | 62 | 59 | 60 |
| 61 | 60 | 61 | 62 | 63 | 60 | 61 | 62 | 63 | 61 |
| 62 | 60 | 61 | 62 | 63 | 60 | 61 | 62 | 63 | 61.5 |
| 63 | 60 | 61 | 62 | 63 | 60 | 61 | 62 | 63 | 61.5 |

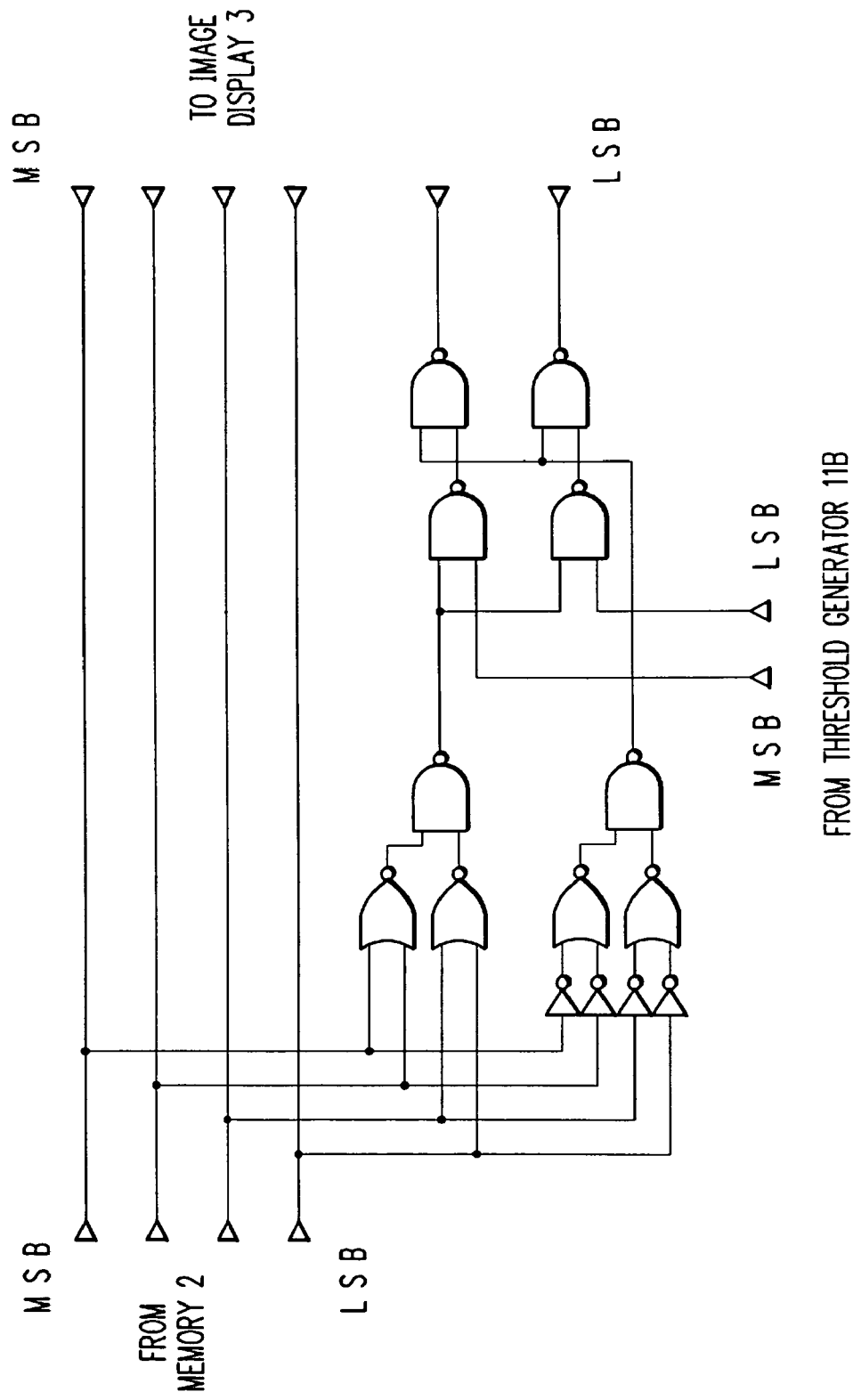
F I G. 18

| X mod 4 | Y mod 4 | OUTPUT VALUE |
|---------|---------|--------------|
| 00 | 00 | 000 |
| 00 | 01 | 010 |
| 00 | 10 | 100 |
| 00 | 11 | 010 |
| 01 | 00 | 011 |
| 01 | 01 | 001 |
| 01 | 10 | 011 |
| 01 | 11 | 001 |
| 10 | 00 | 100 |
| 10 | 01 | 010 |
| 10 | 10 | 000 |
| 10 | 11 | 010 |
| 11 | 00 | 011 |
| 11 | 01 | 001 |
| 11 | 10 | 011 |
| 11 | 11 | 001 |

F I G. 25

(a)

| Y mod 4 | 104A | 104B | 104C | 104D |
|---------|------|------|------|------|
| 00 | 00 | 11 | 11 | 10 |
| 01 | 10 | 01 | 01 | 00 |
| 10 | 11 | 10 | 00 | 11 |
| 11 | 01 | 00 | 10 | 01 |

(b)

$$\text{THRESHOLD} = \begin{pmatrix} \underset{\underset{0}{\downarrow}}{104A} & \underset{\underset{3}{\downarrow}}{104B} & \underset{\underset{3}{\downarrow}}{104C} & \underset{\underset{2}{\downarrow}}{104D} \\ 2 & 1 & 1 & 0 \\ 3 & 2 & 0 & 3 \\ 1 & 0 & 2 & 1 \end{pmatrix}$$

F I G. 27
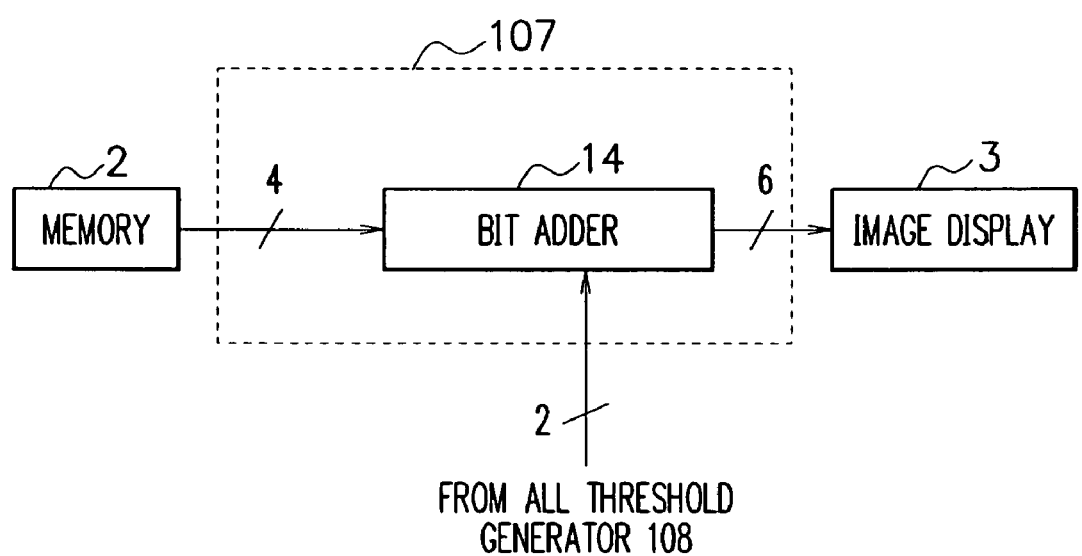

F I G. 29

| Y mod 4 | 108A | 108B | 108C | 108D |
|---|---|---|---|---|
| 00 | 00 | 11 | 11 | 10 |
| 01 | 10 | 01 | 01 | 00 |
| 10 | 11 | 10 | 00 | 11 |
| 11 | 01 | 00 | 10 | 01 |

| Y mod 4 | T[4...0] |
|---|---|
| 00 | 00111 |
| 01 | 10010 |
| 10 | 11100 |
| 11 | 01001 |

F I G. 35

| Y mod 4 | T[4...0] | T4T3 (FIRST LINE) | T2T1 (SECOND LINE) | T0T1 (THIRD LINE) | T2T3 (FOURTH LINE) |
|---|---|---|---|---|---|
| 00 | 00111 | 00 | 11 | 11 | 10 |
| 01 | 10010 | 10 | 01 | 01 | 00 |
| 10 | 11100 | 11 | 10 | 00 | 11 |
| 11 | 01001 | 01 | 00 | 10 | 01 |

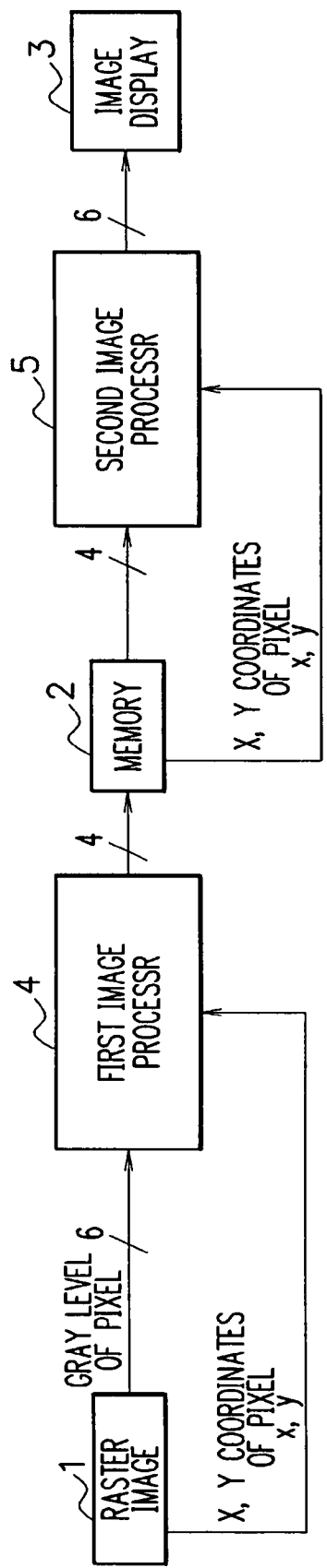
F I G. 36

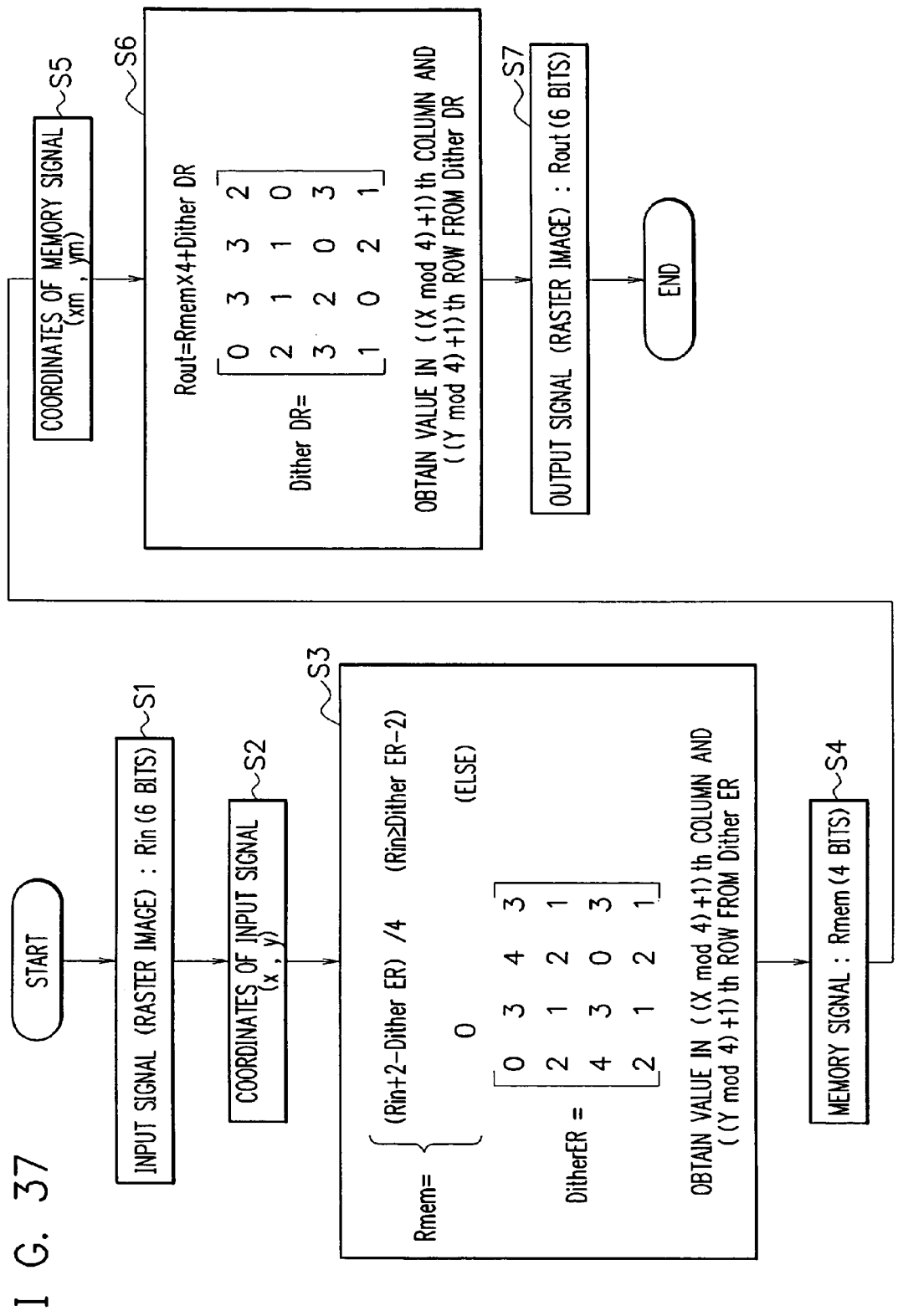
F I G. 37

FIG. 43

$$\text{THRESHOLD} = \begin{bmatrix} 0 & 1 \\ 0 & 1 \end{bmatrix}$$

$$\text{OFFSET} = \begin{bmatrix} 0 & 0 \\ 1 & 1 \end{bmatrix}$$

IMAGE PROCESSING APPARATUS, IMAGE TRANSMISSION APPARATUS, DISPLAY, IMAGE PROCESSING METHOD, AND IMAGE TRANSMISSION METHOD

FIELD OF THE INVENTION

The present invention relates to an image processing apparatus, an image transmission apparatus, a display, an image processing method and an image transmission method. More particularly, the present invention relates to an image processing apparatus, an image transmission apparatus, a display, an image processing method and an image transmission method for achieving high quality images in image processing by a display having a memory which stores raster images as well as improving efficiency in the transmission of raster images from a computer to the display.

BACKGROUND OF THE INVENTION

At present, an image is transmitted from a computer to a display in such a manner as to transmit a raster image with respect to each frame frequency. This requires a large amount of transmission data, and involves unnecessary transmission when a still image is being displayed.

As one approach to reducing the amount of transmission data, an image may be compressed into a file format such as JPEG or GIF, and then transmitted. However, this approach requires a processor which performs high-speed operation for compressing and decompressing the image with respect to each frame, resulting in an increase in cost.

There may be used a different approach than the image compression, which involves reducing the bit-plane number of a raster image. The bit-plane number herein means the bit number "n": the number of bits of data representing the tone or gray level of a digital image which has been quantized by $2^n$. Examples of the methods for reducing the bit-plane number include the multi-level dither method and the fixed threshold method. A detailed description of these methods is found in "The New Image Electron Handbook" (Tokyo, Corona Publishing Co. Ltd., 1993), pp. 41-51. The multi-level dither method and the fixed threshold method differ from the image compression method utilizing a format such as JPEG or GIF in that compressed images do not need decompression.

The conventional multi-level dither method and the fixed threshold method, however, have some problems as follows.

1. The reduction of the bit-plane number causes false contours, false colors and graininess or granularity, thus deteriorating the quality of an image.

2. In the case of superimpose display (a technique for superimposing a different image such as "text" on a displayed screen image), a plurality of images (e.g. a picture or a graphic and text) are necessary as input images, which increases the amount of input image data. Therefore, it becomes difficult to store the input images in a memory and transmit them via a transmission bus which has a limitation in bus width.

3. With a display of, for example, a mobile terminal, having a display screen of low maximum resolution, it is necessary to scroll the content of the screen when an image displayed thereon is large as a map. This scroll display is deceptively simple operation. However, a display memory has to be rewritten many times, and accordingly, electric power consumption is increased.

4. In the case of dithering for a raster image, a high-frequency minimal noise can be obtained as the dither period becomes shorter, and it is possible to reduce deterioration in picture quality. However, the number of pixels in the main scanning direction of a display is generally a number including "2" to "6" as a factor (480, 720, 840, etc.). Therefore, image quality deteriorates through compression and decompression of the image. When the dither period is set to a larger value so as not to be a factor of the number of pixels in the main scanning direction of a display, a high-frequency minimal noise, the intended purpose of dither processing, cannot be achieved. Thus, image quality deteriorates by compression and decompression of the image.

In Japanese Patent Application laid open No. 2003-162272 (Reference 1), there is disclosed a conventional technique entitled "Image processing apparatus, Image transmission apparatus, Image reception apparatus and Image processing method" for solving the problems.

FIG. 1 is a diagram showing an example of the construction of the conventional image processing apparatus. In the image processing apparatus, an input image is dithered first according to the X and Y coordinates of the pixel, and then quantized to be stored in a memory. The data read out from the memory is subjected to inverse quantization. Thereafter, the same dither matrix as used for dithering the input image is added to the data to output it to a display.

The image processing apparatus, however, causes a distortion of 0.5 in the gray level of an image before and after dithering. Consequently, the image after dithering becomes brighter by a gray level of 0.5 as compared to that before dithering.

The gray-level distortion or change is particularly distinguishable when dithered images and non-dithered images are displayed alternately.

To correct gray level for the distortion of 0.5, an offset of 0.5 may be added to the image signal.

FIG. 2 is a diagram showing another example the construction of the conventional image processing apparatus in which an offset is added to an image signal on the output side. In this case, possible dither values are 0, 1, 2 and 3, while an offset is 0 or −1 which is to be added to an image signal to correct gray-level distortion.

That is, one of the values −1, 0, 1, 2 and 3 is added to an image signal after inverse quantization, and the additional value can be either positive or negative. Therefore, the addition of an offset to an input signal requires not an adder circuit but an adder-subtractor circuit. However, compared to an adder circuit, the size of an adder-subtractor circuit is larger by at least 20%, and the circuit size inevitably increases.

FIG. 3 is a diagram showing another example the construction of the conventional image processing apparatus in which an offset is added to an image signal on the input side. In this case, a value to be added to an image signal is 0 or −1. Accordingly, a subtractor circuit can be employed without need for an adder-subtractor circuit. In other words, if an offset is added to an image signal on the input side, an increase in circuit size can be suppressed.

FIG. 4 is a diagram showing examples of offset matrices to be added to a dither matrix to correct distortion between input and output signal values. In the case of Offset Example 1 in FIG. 4, the average gray level of output signals is 16.5, and the problem of gray level distortion cannot be solved. On the other hand, in the case of Offset Example 2, the average gray level of output signals is 17, and the problem of gray level distortion can be solved. That is, by selecting an appropriate offset, no gray-level distortion occurs.

FIG. 5 is a diagram showing distortions in output values in the case of no offset. FIG. 6 is a diagram showing distortions in output values in the case where an offset matrix, indicated as Offset Example 2 in FIG. 4, is added to a conventional threshold matrix to perform bit addition. As can be seen in FIG. 5, when no offset is applied, the same output value appears for every two pixels in each row. Meanwhile, as shown in FIG. 6, when Offset Example 2 is applied, the same output value appears for every four pixels in the first and third rows.

Generally, when at a low frequency, noise components are human-perceivable. Therefore, the application of Offset Example 2 deteriorates image quality.

In other words, by simply adding an offset to an image signal on the input side, gray-level distortion cannot be corrected. Even if gray-level distortion can be corrected, cyclic noise is generated, which deteriorates image quality.

As just described, the conventional technique has some problems in that the correction of distortion in gray level before and after dithering necessitates the increase of circuit size and the generation of cyclic noise which causes image deterioration.

SUMMARY OF THE INVENTION

It is therefore an object of the present invention to provide an image processing apparatus, an image transmission apparatus, a display, an image processing method and an image transmission method, capable of suppressing tone or gray-level distortion before and after dithering as well as reducing and then increasing the number of bit-planes of an image.

In accordance with the first aspect of the present invention, to achieve the object mentioned above, there is provided an image processing apparatus comprising a first image processor for performing multi-level dithering based on a two-dimensional dither matrix to reduce the bit-plane number of a raster image as an original image, a memory for storing image data of the raster image whose bit-plane number has been reduced by the first image processor, and a second image processor for performing bit addition for the image data read out from the memory to increase the bit-plane number thereof. The first image processor applies to the multi-level dithering a summation matrix of a threshold matrix and an offset matrix as offset values for minimizing the difference between the signal value of the original image and the average of all the dither values of the raster image whose bit-plane number has been increased. The threshold matrix is obtained by changing matrix values of the two-dimensional dither matrix corresponding to matrix values of the offset matrix not being "0" (zero) to values other than their original values, respectively.

Preferably, in the first aspect, the matrix values of the threshold matrix have been changed from their original values in the two-dimensional dither matrix so that the same matrix values are arranged separately in the summation matrix.

Preferably, in the first aspect, a sequence of two or more matrix values "1" and a sequence of two or more matrix values "0" are alternately arranged in both row and column directions to form a checkered pattern in the offset matrix. Besides, the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

Preferably, in the first aspect, the first image processor adds a constant offset matrix corresponding to the number of reduced bit-planes to the offset matrix.

The image processing apparatus may further comprise a summation matrix generator for generating the summation matrix of the threshold matrix and the offset matrix.

The first image processor may generate a composite matrix of the summation matrix and the constant offset matrix as well as adding the constant offset matrix corresponding to the number of reduced bit-planes to the offset matrix.

Preferably, in the first aspect, when the image signal of the raster image after the bit-plane reduction has the maximum gray level, the second image processor sets the gray level of the image signal of the raster image after the bit-plane addition to the maximum gray level. On the other hand, when the image signal of the raster image after the bit-plane reduction has the minimum gray level, the second image processor sets the gray level of the image signal of the raster image after the bit-plane addition to the minimum gray level.

Preferably, in the first aspect, the raster image is a red-green-blue (RGB) color image in which respective R, G and B color signals have the same number of bit-planes. More preferably, the bit-plane number of the B signal is reduced most, while the bit-plane number of the G signal is reduced least. Or, the raster image is an RGB color image having color components R, G and B. The first image processor reduces the bit-plane number of at least one of the color components, and after that, the second image processor increases the bit-plane number reduced by the first image processor.

Preferably, in the first aspect, the second image processor performs the bit addition based on the threshold matrix.

In accordance with the first aspect of the present invention, the first image processor reduces the bit-plane number of a raster image as an original image, and after that, the second image processor increases the bit-plane number reduced by the first image processor. Thereby, the image processing apparatus can compress and decompress a bitmap image transmitted to a display with less logic elements, thus enabling reductions in memory capacity and transmission capacity.

Further, the first image processor performs the multi-level dithering to reduce the bit-plane number of a raster image based on the summation (summation matrix) of the "offset matrix" and the "threshold matrix" obtained by changing part of values in the two-dimensional dither matrix. The second image processor performs the bit addition based on the threshold matrix used for the multi-level dithering to increase the bit-plane number reduced by the first image processor. By virtue of this construction, the image processing apparatus can minimize the distortion or difference between an image after the bit addition and the original image as compared to a conventional image processing apparatus. In addition, it is possible to suppress graininess and false colors seen when there is a large difference between the two images, and achieve high quality image display.

Incidentally, in the case where the image processing apparatus is applied to a display whose drive circuit is formed on a substrate (e.g. a glass substrate), the apparatus can be formed on the substrate by the same process. Therefore, the application of the image processing apparatus enables reductions in memory space or area and electric power consumption.

In accordance with the second aspect of the present invention, to achieve the object mentioned above, there is provided an image transmission apparatus comprising a first unit for performing multi-level dithering based on a two-dimensional dither matrix to reduce the bit-plane number of a raster image as an original image, and a second unit for performing bit addition for the raster image whose bit-plane number has been reduced by the first unit to increase the bit-plane number. The first unit sends the raster image with less bit-plane number to the second unit. The first unit applies to the multi-level dithering a summation matrix of a threshold matrix and an offset matrix as offset values for minimizing the difference between the gray level of the original image and the average of all the dither values of the raster image whose bit-plane number has been increased. The threshold matrix is obtained by changing matrix values of the two-dimensional dither matrix corresponding to matrix values of the offset matrix not being "0" (zero) to values other than their original values, respectively.

Preferably, in the second aspect, the matrix values of the threshold matrix have been changed from their original values in the two-dimensional dither matrix so that the same matrix values are arranged separately in the summation matrix.

Preferably, in the second aspect, a sequence of two or more matrix values "1" and a sequence of two or more matrix values "0" are alternately arranged in both row and column directions to form a checkered pattern in the offset matrix. Besides, the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

Preferably, in the second aspect, the first unit adds a constant offset matrix corresponding to the number of reduced bit-planes to the offset matrix.

The first unit may include a summation matrix generator for generating the summation matrix of the threshold matrix and the offset matrix.

The first unit may generate a composite matrix of the summation matrix and the constant offset matrix as well as adding the constant offset matrix corresponding to the number of reduced bit-planes to the offset matrix.

Preferably, in the second aspect, when the image signal of the raster image after the bit-plane reduction has the maximum gray level, the second unit sets the gray level of the image signal of the raster image after the bit-plane addition to the maximum gray level. On the other hand, when the image signal of the raster image after the bit-plane reduction has the minimum gray level, the second unit sets the gray level of the image signal of the raster image after the bit-plane addition to the minimum gray level.

Preferably, in the second aspect, the raster image is an RGB color image in which respective R, G and B color signals have the same number of bit-planes. More preferably, the bit-plane number of the B signal is reduced most, while the bit-plane number of the G signal is reduced least. Or, the raster image is an RGB color image having color components R, G and B. The first unit reduces the bit-plane number of at least one of the color components, and after that, the second unit increases the bit-plane number reduced by the first unit.

Preferably, in the second aspect, the second unit performs the bit addition based on the threshold matrix.

In accordance with the second aspect of the present invention, in the image transmission apparatus to send a raster image from the first unit to the second unit, the first unit reduces the bit-plane number of an original image to send the raster image with less bit-plane number to the second unit. The second unit increases the bit-plane number of the raster image received from the first unit to the number equal to or more than the bit-plane number of the original image. Thereby, it is possible to improve efficiency in the transmission capacity. More specifically, the first unit performs the multi-level dithering based on the two-dimensional dither matrix for a raster image as an original image to send the raster image with less bit-plane number to the second unit. Having received the raster image from the first unit, the second unit performs the bit addition based on the two-dimensional dither matrix used for the multi-level dithering so that the bit-plane number of the raster image matches that of the original image. By virtue of this construction, the image transmission apparatus can improve the effective use of transmission capacity.

For example, in the case of transmitting an RGB raster image with 6 bits per color component (18 bits in total) via a transmission bus having a width of 16 bits, the raster image is compressed by reducing the bit-plane number. Thereby, the parallel transmission of data becomes available.

In accordance with the third aspect of the present invention, to achieve the object mentioned above, there is provided a display comprising a first image processor for performing multi-level dithering based on a two-dimensional dither matrix to reduce the bit-plane number of a raster image as an original image, a memory for storing image data of the raster image whose bit-plane number has been reduced by the first image processor, a second image processor for performing bit addition for the image data read out from the memory to increase the bit-plane number thereof, and an image display for displaying an image corresponding to the image data whose bit-plane number has been increased by the second image processor. The first image processor applies to the multi-level dithering a summation matrix of a threshold matrix and an offset matrix as offset values for minimizing the difference between the signal value of the original image and the average of all the dither values of the raster image whose bit-plane number has been increased. The threshold matrix is obtained by changing matrix values of the two-dimensional dither matrix corresponding to matrix values of the offset matrix not being "0" (zero) to values other than their original values, respectively.

Preferably, in the third aspect, the matrix values of the threshold matrix have been changed from their original values in the two-dimensional dither matrix so that the same matrix values are arranged separately in the summation matrix.

Preferably, in the third aspect, a sequence of two or more matrix values "1" and a sequence of two or more matrix values "0" are alternately arranged in both row and column directions to form a checkered pattern in the offset matrix. Besides, the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

Preferably, in the third aspect, the first image processor adds a constant offset matrix corresponding to the number of reduced bit-planes to the offset matrix.

The display may further comprise a summation matrix generator for generating the summation matrix of the threshold matrix and the offset matrix.

The first image processor may generate a composite matrix of the summation matrix and the constant offset matrix as well as adding the constant offset matrix corresponding to the number of reduced bit-planes to the offset matrix.

Preferably, in the third aspect, when the image signal of the raster image after the bit-plane reduction has the maximum gray level, the second image processor sets the gray level of the image signal of the raster image after the bit-plane addition to the maximum gray level. On the other hand, when the image signal of the raster image after the bit-plane reduction has the minimum gray level, the second image processor sets the gray level of the image signal of the raster image after the bit-plane addition to the minimum gray level.

Preferably, in the third aspect, the raster image is an RGB color image in which respective R, G and B color signals have the same number of bit-planes. More preferably, the bit-plane number of the B signal is reduced most, while the bit-plane number of the G signal is reduced least. Or, the raster image is an RGB color image having color components R, G and B. The first image processor reduces the bit-plane number of at least one of the color components, and after that, the second image processor increases the bit-plane number reduced by the first image processor.

Preferably, in the third aspect, the second image processor performs the bit addition based on the threshold matrix.

The display may comprise a plurality of the second image processors for respective pixels on one line in the main scanning direction of the image display. In such a case, image data with respect to one line in the main scanning direction of the image display are output all at once to the second image processors corresponding to respective pixels on the line. The display may further comprise an all threshold generator for generating threshold values used for the bit addition by the respective second image processors all at once to output the threshold values to the second image processors, respectively.

Preferably, in the third aspect, the second image processor is formed on the same substrate where the drive circuit of the display is formed, and also the first image processor is formed on the same substrate where the drive circuit of the display is formed.

In accordance with the third aspect of the present invention, the first image processor once reduces the bit-plane number of an image to less than that of the original image. After that, the second image processor increases the bit-plane number reduced by the first image processor to display the image. By virtue of this construction, the image comparable in quality to the original image can be obtained.

In accordance with the fourth aspect of the present invention, to achieve the object mentioned above, there is provided an image processing method comprising the steps of performing as first image processing multi-level dithering based on a two-dimensional dither matrix to reduce the bit-plane number of a raster image as an original image, storing image data of the raster image whose bit-plane number has been reduced in a memory, and performing as second image processing bit addition for the image data read out from the memory to increase the bit-plane number thereof. In the first image processing, a summation matrix of a threshold matrix and an offset matrix is applied to the multi-level dithering. The offset matrix represents offset values for minimizing the difference between the signal value of the original image and the average of all the dither values of the raster image whose bit-plane number has been increased. The threshold matrix is obtained by changing matrix values of the two-dimensional dither matrix corresponding to matrix values of the offset matrix not being "0" (zero) to values other than their original values, respectively.

Preferably, in the fourth aspect, the matrix values of the threshold matrix have been changed from their original values in the two-dimensional dither matrix so that the same matrix values are arranged separately in the summation matrix.

Preferably, in the fourth aspect, a sequence of two or more matrix values "1" and a sequence of two or more matrix values "0" are alternately arranged in both row and column directions to form a checkered pattern in the offset matrix. Besides, the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

Preferably, in the fourth aspect, in the first image processing, a constant offset matrix corresponding to the number of reduced bit-planes is added to the offset matrix.

Preferably, in the fourth aspect, in the second image processing, when the image signal of the raster image after the bit-plane reduction has the maximum gray level, the gray level of the image signal of the raster image after the bit-plane addition is set to the maximum gray level. On the other hand, when the image signal of the raster image after the bit-plane reduction has the minimum gray level, the gray level of the image signal of the raster image after the bit-plane addition is set to the minimum gray level.

Preferably, in the fourth aspect, the raster image is an RGB color image in which respective R, G and B color signals have the same number of bit-planes. More preferably, the bit-plane number of the B signal is reduced most, while the bit-plane number of the G signal is reduced least. Or, the raster image is an RGB color image having color components R, G and B. The bit-plane number of at least one of the color components is reduced in the first image processing, and after that, the bit-plane number reduced by the first image processing is increased in the second image processing.

Preferably, in the fourth aspect, in the second image processing, the bit addition is performed based on the threshold matrix.

In accordance with the fourth aspect of the present invention, the bit-plane number of a raster image as an original image is reduced in the first image processing, and after that, the bit-plane number reduced by the first image processing is increased in the second image processing. Thereby, the image processing method enables a bitmap image transmitted to a display to be compressed and decompressed with less logic elements. Thus, it is possible to reduce the memory capacity and transmission capacity of an apparatus to which the image processing method is applied.

Further, the multi-level dithering is performed to reduce the bit-plane number of a raster image based on the summation (summation matrix) of the "offset matrix" and the "threshold matrix" obtained by changing part of values in the two-dimensional dither matrix. Thereafter, the bit addition is performed based on the threshold matrix used for the multi-level dithering to increase the bit-plane number. Consequently, the image processing method can minimize the distortion or difference between an image after the bit addition and the original image as compared to a conventional image processing method. In addition, it is possible to suppress graininess and false colors seen when there is a large difference between the two images, and achieve high quality image display.

In accordance with the fifth aspect of the present invention, to achieve the object mentioned above, there is provided an image transmission method comprising the steps of performing by a first unit multi-level dithering based on a two-dimensional dither matrix to reduce the bit-plane number of a raster image as an original image, sending the raster image with less bit-plane number from the first unit to a second unit, and performing by the second unit bit addition for the raster image whose bit-plane number has been reduced by the first unit to increase the bit-plane number. The first unit applies to the multi-level dithering a summation matrix of a threshold matrix and an offset matrix as offset values for minimizing the difference between the gray level of the original image and the average of all the dither values of the raster image whose bit-plane number has been increased. The threshold matrix is obtained by changing matrix values of the two-dimensional dither matrix corresponding to matrix values of the offset matrix not being "0" (zero) to values other than their original values, respectively.

Preferably, in the fifth aspect, the matrix values of the threshold matrix have been changed from their original values in the two-dimensional dither matrix so that the same matrix values are arranged separately in the summation matrix.

Preferably, in the fifth aspect, a sequence of two or more matrix values "1" and a sequence of two or more matrix values "0" are alternately arranged in both row and column directions to form a checkered pattern in the offset matrix. Besides, the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

Preferably, in the fifth aspect, the first unit adds a constant offset matrix corresponding to the number of reduced bit-planes to the offset matrix.

Preferably, in the fifth aspect, when the image signal of the raster image after the bit-plane reduction has the maximum gray level, the second unit sets the gray level of the image signal of the raster image after the bit-plane addition to the maximum gray level. On the other hand, when the image signal of the raster image after the bit-plane reduction has the minimum gray level, the second unit sets the gray level of the image signal of the raster image after the bit-plane addition to the minimum gray level.

Preferably, in the fifth aspect, the raster image is an RGB color image in which respective R, G and B color signals have the same number of bit-planes. More preferably, the bit-plane number of the B signal is reduced most, while the bit-plane number of the G signal is reduced least. Or, the raster image is an RGB color image having color components R, G and B. The first unit reduces the bit-plane number of at least one of the color components, and after that, the second unit increases the bit-plane number reduced by the first unit.

Preferably, in the fifth aspect, the second unit performs the bit addition based on the threshold matrix.

In accordance with the fifth aspect of the present invention, the first unit reduces the bit-plane number of an original image to send a raster image with less bit-plane number to the second unit. Thereby, it is possible to improve efficiency in the transmission capacity. More specifically, the first unit performs the multi-level dithering for a raster image as an original image based on the summation (summation matrix) of the "offset matrix" and the "threshold matrix" obtained by changing part of values in the two-dimensional dither matrix to send the raster image with less bit-plane number to the second unit. Having received the raster image from the first unit, the second unit performs the bit addition based on the threshold matrix used for the multi-level dithering so that the bit-plane number of the raster image matches that of the original image. Thus, the image transmission method can improve the effective use of transmission capacity.

For example, in the case of transmitting an RGB raster image with 6 bits per color component (18 bits in total) via a transmission bus having a width of 16 bits, the raster image is compressed by reducing the bit-plane number. Thereby, the parallel transmission of data becomes available.

As is described above, in accordance with the present invention, it is possible to realize an image processing apparatus, an image transmission apparatus, a display, an image processing method and an image transmission method, capable of suppressing tone or gray-level distortion before and after dithering as well as reducing and then increasing the bit-plane number of an image.

BRIEF DESCRIPTION OF THE DRAWINGS

The exemplary aspects and features of the present invention will become more apparent from the consideration of the following detailed description taken in conjunction with the accompanying drawings in which:

FIG. 4 is a diagram showing examples of offset matrices to be added to a dither matrix to correct distortion between an input signal value and an output signal value;

FIG. 7($a$) is a diagram showing an example of a conventional threshold matrix;

FIG. 7($b$) is a diagram showing an example of a threshold matrix and an offset matrix used for image processing according to the present invention;

FIG. 8 is a diagram showing an example of a summation matrix used for dithering in image processing according to the present invention;

FIG. 9 is a diagram showing the relationship between an input signal and an output signal subjected to image processing according to the present invention;

FIG. 10 is a diagram showing an example of a threshold matrix and a summation matrix used for image processing according to the present invention;

FIG. 12 is a diagram showing the relationship between input values to a threshold generator and output values therefrom in the image processing apparatus depicted in FIG. 11;

FIG. 13 is a diagram showing the relationship between input values to an offset generator and output values therefrom in the image processing apparatus depicted in FIG. 11;

FIG. 17 is a diagram showing combinations of initial threshold values and initial offset values, and the relationship between an input signal stored in a memory and output signals corresponding to the respective combinations in the image processing apparatus depicted in FIG. 11;

FIG. 18 is a diagram showing the construction of a bit adder of an image processing apparatus according to the second embodiment of the present invention;

FIG. 19 is a diagram showing combinations of initial threshold values and initial offset values, and the relationship between an input signal stored in a memory and output signals corresponding to the respective combinations in the image processing apparatus of the second embodiment;

FIG. 21 is a diagram showing the relationship between input values to an offset-inclusive threshold generator and output values therefrom in the image processing apparatus depicted in FIG. 20;

FIG. 25 is a diagram showing the relationship between input values to a threshold generator and output values therefrom in the display depicted in FIG. 23;

FIG. 27 is a diagram showing the construction of a second image processor of the display depicted in FIG. 26;

FIG. 29 is a diagram showing the relationship between input values to the all threshold generator and output values therefrom in the display depicted in FIG. 26;

FIG. 35 is a diagram showing the relationship between input values to the second image processor and output values therefrom in the display depicted in FIG. 31;

FIG. 36 is a diagram showing the construction of an apparatus to which is applied an image processing method according to the eighth embodiment of the present invention;

FIG. 37 is a flowchart showing operation according to the image processing method of the eighth embodiment;

FIG. 43 is a diagram showing an example of a threshold matrix and an offset matrix used for image processing by the image processing apparatus depicted in FIG. 42;

DESCRIPTION OF THE PREFERRED EMBODIMENTS

Figure 1:
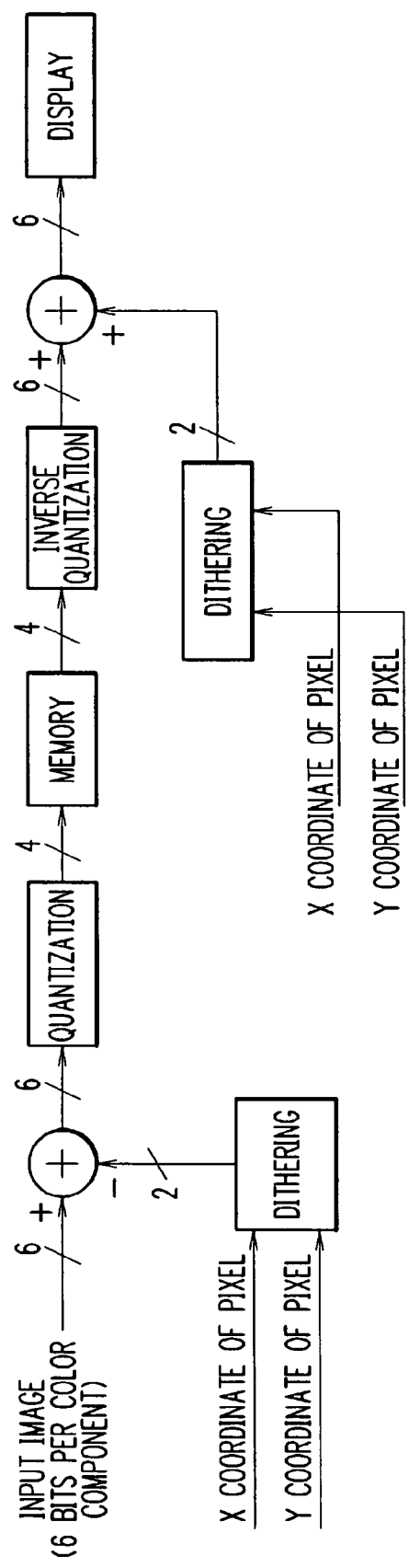
FIG. 1 is a diagram showing an example of a construction of the conventional image processing apparatus.
Figure 2:
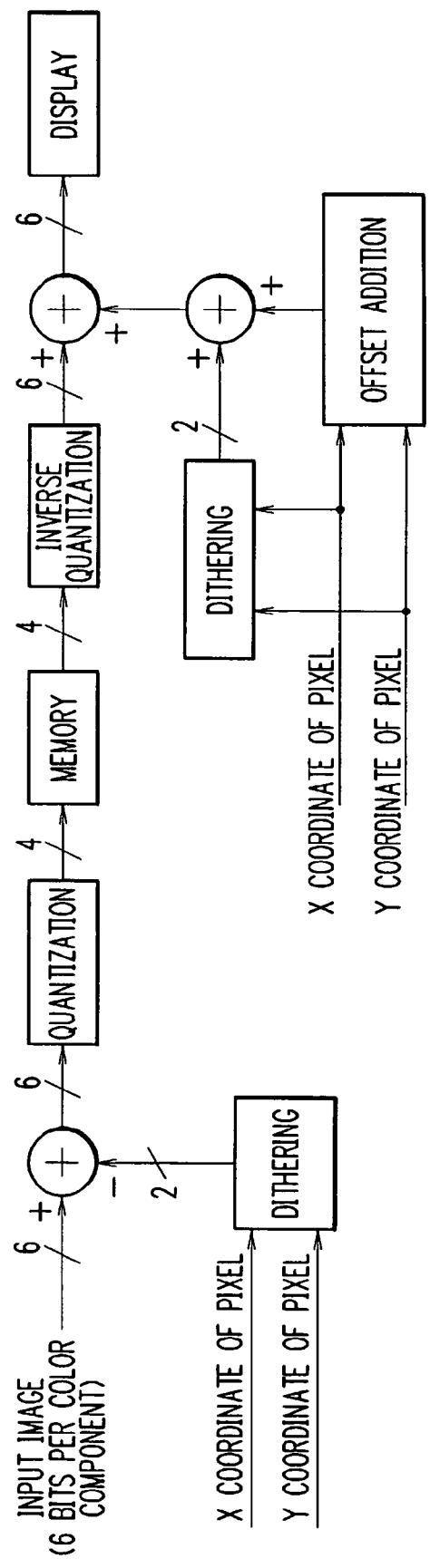
FIG. 2 is a diagram showing another example the construction of the conventional image processing apparatus in which an offset is added to an image signal on the output side.
Figure 3:
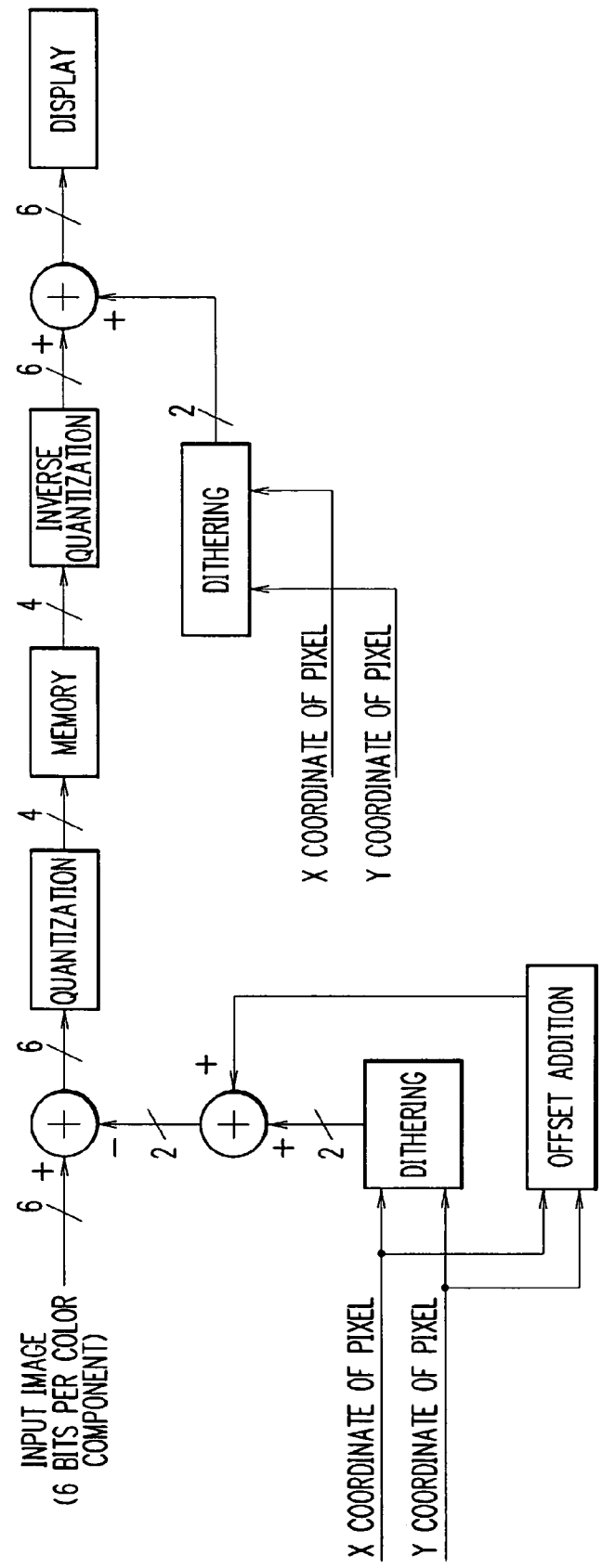
FIG. 3 is a diagram showing another example the construction of the conventional image processing apparatus in which an offset is added to an image signal on the input side.
Figure 5:
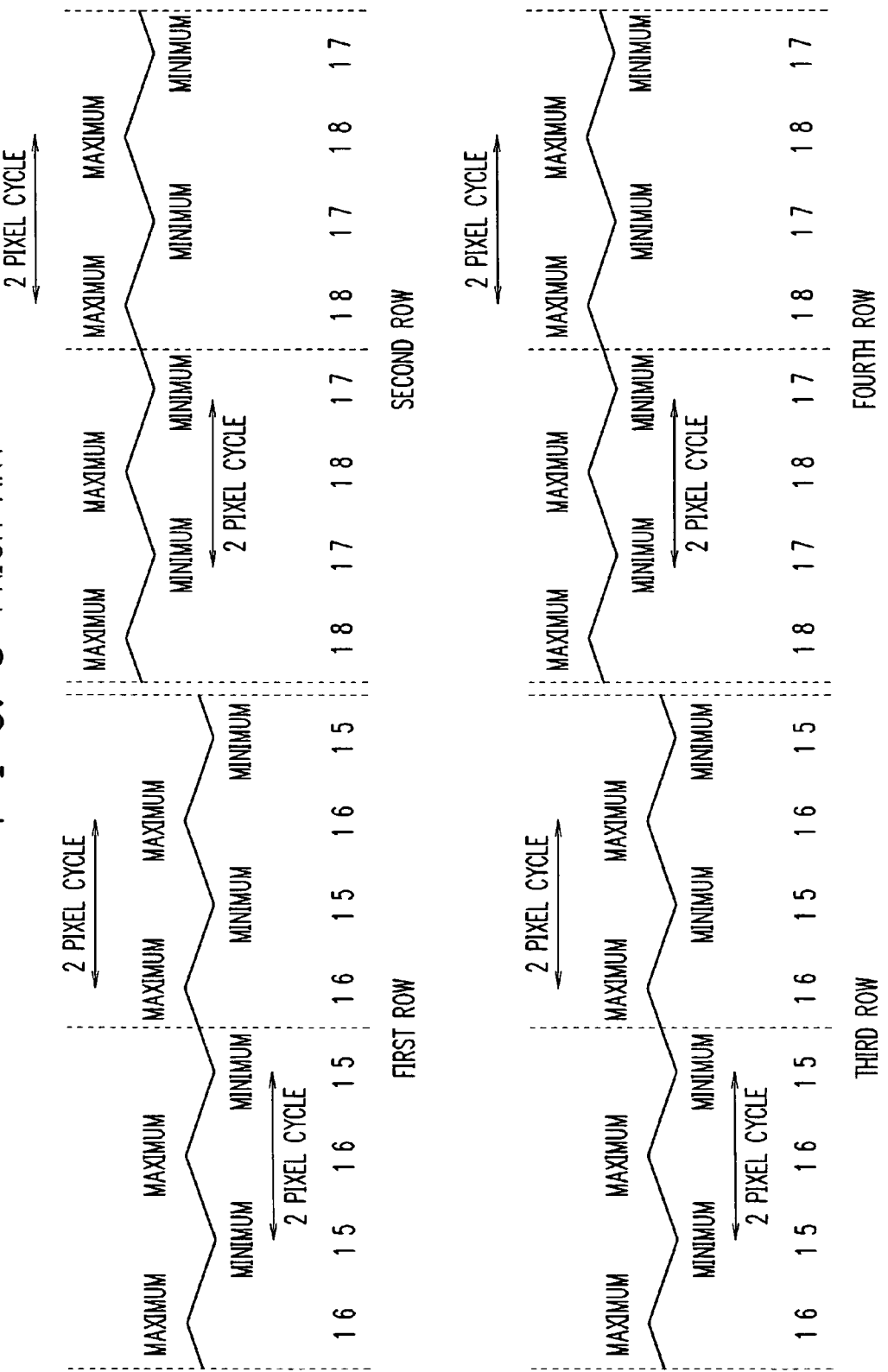
FIG. 5 is a diagram showing distortions in output values in the case of no offset.
Figure 6:
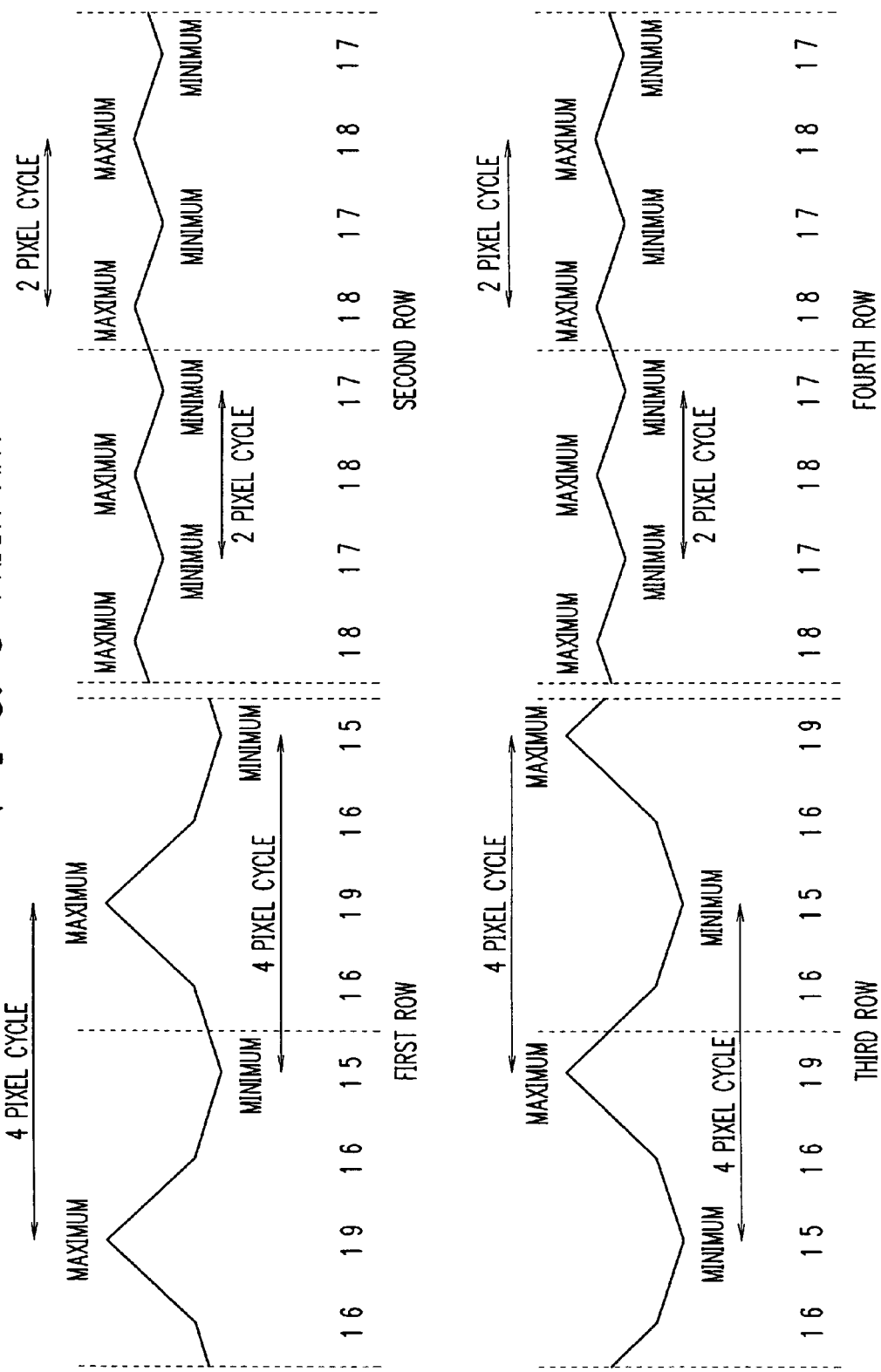
FIG. 6 is a diagram showing distortions in output values in the case where an offset matrix, indicated as Offset Example 2 in FIG. 4, is added to a conventional threshold matrix to perform bit addition.

Referring now to the drawings, a description of preferred embodiments of the present invention will be given in detail.

In order to reduce graininess or granularity caused by dithering, it is necessary to select additional threshold values (dither values) of high spatial frequency. In the case, for example, where dithering is performed with the use of a two-dimensional dither matrix by which the same pattern is repeated for a micro length as one cycle in both vertical and horizontal directions of an image, as the cycle of the dither matrix becomes shorter, the frequency of cyclic noise gets higher, and the noise is made imperceptible. However, as is previously described, if offset values such as Offset Example 2 are added to a conventional threshold matrix (two-dimensional dither matrix of two pixel cycle both vertically and horizontally) shown in FIG. 7(a), the matrix after the addition contains low frequency components. As a result, graininess becomes more pronounced.

For that reason, in accordance with the present invention, only the matrix values of a threshold matrix corresponding to offset values "1" are set to specific values, as shown in FIG. 7(b), differently from the conventional threshold matrix so that the matrix of the sum of threshold values and offset values contains as few low frequency components as possible. In a summation matrix of the present invention shown in FIG. 8, the same matrix values are arranged separately (i.e., not adjacent to each other) as in the conventional threshold matrix, which suppresses the generation of low frequency components.

In the following, a description will be given of a method of determining threshold values corresponding to offset values "1". In the conventional threshold matrix, matrix or threshold values other than "0" are reduced by 1, while matrix or threshold values "0" are increased to the possible maximum value in the matrix. For example, in the case of a 2-bit matrix, possible values in the matrix are "0" to "3". Accordingly, in the conventional threshold matrix, matrix values "1" to "3" are reduced by 1 to "0" to "2", respectively, while matrix values "0" are increased to "3".

Thereby, as shown in FIG. 7(b), a threshold matrix is obtained in which the average of matrix values in each area encircled by a dotted line where the offset is set coincides with that of matrix values in each area encircled by a solid line where the offset is not set. As shown in FIG. 8, in the summation matrix obtained by combining the threshold matrix with the offset values, the same matrix values are arranged separately (i.e., not adjacent to each other). Thus, the summation matrix can make graininess less noticeable when used for dithering.

The threshold matrix and offset matrix may be set in the following order:

(1) An offset matrix is defined so that units of values (not including 1×1) are arranged in a checkered pattern. Each offset takes a value of "0" or "1".

(2) A threshold matrix is defined by computing matrix values in the areas corresponding to offset values "1" in the manner previously described.

However, in the case where the spatial frequency of a matrix (summation matrix) actually used for dithering becomes higher, the threshold matrix and offset matrix may be set otherwise.

As a concrete example, a description will be given of the case where a monotone image (all the pixels have the same gray level) with a gray level or grayscale of 17 is input as a 6-bit raster image referring to FIG. 9. Incidentally, in FIG. 9, "output value" indicates the gray level of an image signal whose bit-plane number has been once reduced and then increased. When dithering is performed for the monotone image with a gray level of 17 by the summation matrix shown in FIG. 8, the average of output values is 17 (gray level of 17). That is, the offset can be added without causing any distortion or change in gray level.

In addition, according to the present invention, output values in the first row are 16, 19, 15 and 18. Compared to a conventional technique in which output values in the first row are 16, 19, 16 and 15, the frequency of noise components (in the monotone image, the components which vary cyclically are noise components) is doubled. Generally, as the frequency of noise components gets higher, the noise components becomes imperceptible by human vision. Therefore, with respect to the raster image whose bit-plane number has been reduced and increased according to the present invention, the noise components are hardly perceptible and the image quality is improved.

Besides, if matrix values in the areas of the checkered pattern corresponding to offset values "1" are replaced in a threshold matrix as shown in FIG. 10 before a summation matrix is obtained in the manner previously described, the same matrix values are arranged separately (i.e., not adjacent to each other). Thus, the summation matrix can make graininess less noticeable when used for dithering.

First Embodiment

Figure 11:
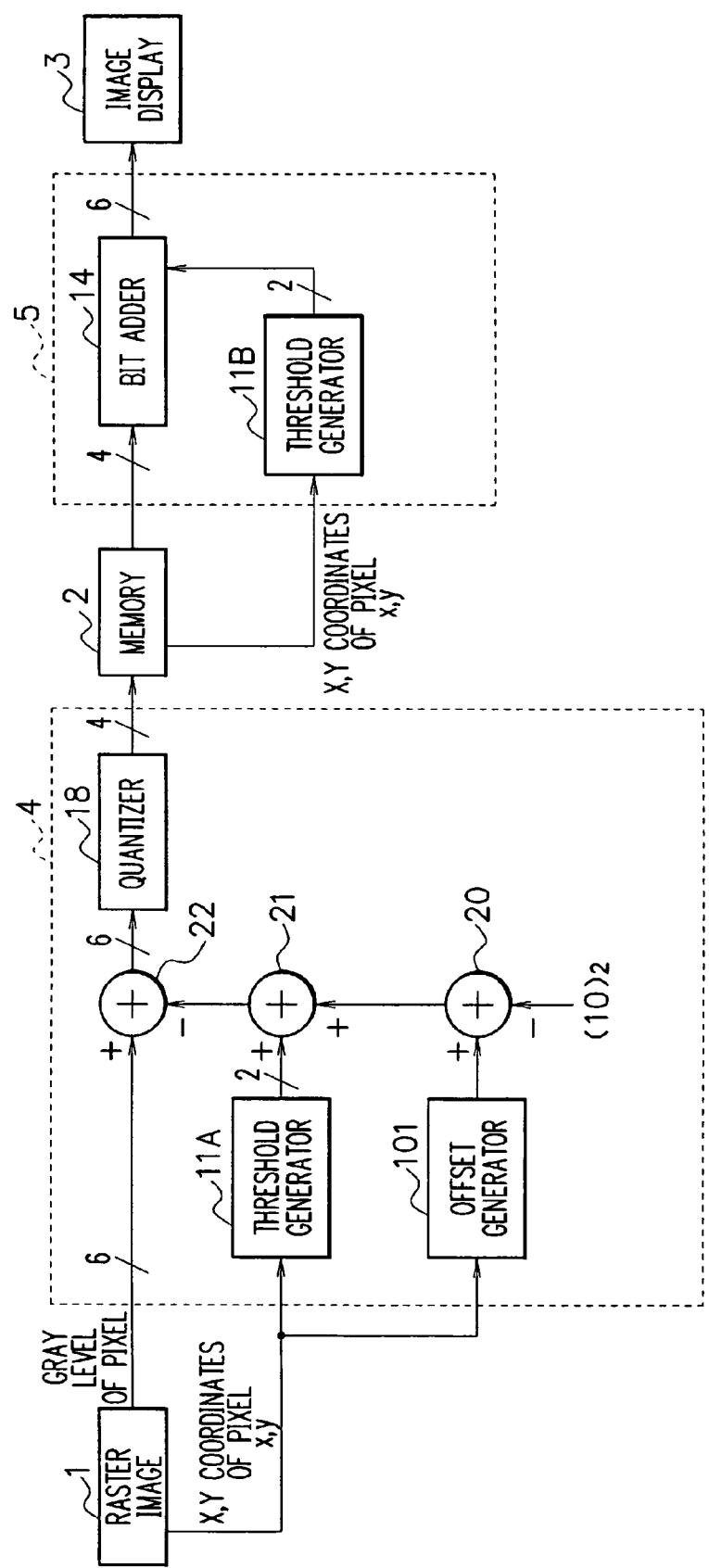
FIG. 11 is a diagram showing the construction of an image processing apparatus according to the first embodiment of the present invention.

In the following, the first embodiment of the present invention will be described. FIG. 11 is a diagram showing the construction of an image processing apparatus according to the first embodiment of the present invention.

The image processing apparatus comprises a first image processor 4, a memory 2, a second image processor 5 and an image display 3. Referring to FIG. 11, an RGB raster image 1 with 6 bits per color component output from a computer is processed in the first image processor 4. Subsequently, a raster image with 4 bits per color component is stored in the memory 2. After that, the raster image with 4 bits per color component read out from the memory 2 is converted to an image with 6 bits per color component in the second image processor 5, and the image is output to the image display 3 capable of 6-bit display.

Incidentally, while FIG. 11 shows a block construction for one of colors R, G and B, the image processing apparatus has the same constructions for the other two colors in parallel.

More specifically, the first image processor 4 performs dithering for the raster image 1 composed of pixels each having a 6-bit gray level to compress it to 4-bit data. The memory 2 stores the 4-bit data. Thereafter, a pixel signal with a 4-bit gray level is output from the memory 2 to the second image processor 5. The second image processor 5 inverse-quantizes the pixel signal from 4 bits to 6 bits. Thus, the image display 3 displays a raster image composed of pixels each having a 6-bit gray level.

The first image processor 4 includes a threshold generator 11A, an offset generator 101, a quantizer 18, a first adder 20, a second adder 21, and a third adder 22.

The threshold generator 11A generates a threshold value used for dithering based on X and Y coordinates (x, y) of a pixel of the raster image 1 input therein. The offset generator 101 generates an offset value added to a pixel signal based on the X and Y coordinates (x, y) of the pixel of the raster image 1 input therein. The quantizer 18 removes two low-order bits from 6-bit data of the raster image 1 input therein to output only four high-order bits of the input data.

The threshold generator 11A generates an output signal (hereinafter sometimes referred to as initial threshold value) based on the X and Y coordinate values (x, y) of a pixel input therein. FIG. 12 is a diagram showing the relationship between input values to the threshold generator 11A and output values therefrom. In FIG. 12, [X mod 4] indicates the remainder when the X coordinate value (x) of a pixel is divided by 4, while [Y mod 4] indicates the remainder when the Y coordinate value (y) of a pixel is divided by 4. The threshold generator 11A generates an output value according to the results of [X mod 4] and [Y mod 4].

The offset generator 101 generates an output signal (hereinafter sometimes referred to as initial offset value) based on the X and Y coordinate values (x, y) of a pixel input therein. FIG. 13 is a diagram showing the relationship between input values to the offset generator 101 and output values therefrom. In FIG. 13, [X mod 4] indicates the remainder when the X coordinate value (x) of a pixel is divided by 4, while [Y mod 4] indicates the remainder when the Y coordinate value (y) of a pixel is divided by 4. The offset generator 101 generates an output value according to the results of [X mod 4] and [Y mod 4].

The first adder 20 is fed with the initial offset value as input to add a constant offset ("2" in decimal form, "10" in binary form) to the offset value. The result of the addition (hereinafter sometimes referred to as synthetic offset value) obtained by the first adder 20 is output to the second adder 21.

The second adder 21 is fed with the synthetic offset value and the initial threshold value as input. The second adder 21 adds up the synthetic offset value and the initial threshold value to output the result of the addition (hereinafter sometimes referred to as summation value) to the third adder 22.

The third adder 22 is fed with 6-bit pixel data and the summation value as input. The third adder 22 adds the summation value to the 6-bit image data to output the result of the addition to the quantizer 18.

FIG. 7(b) shows initial threshold values and initial offset values represented in matrix form. The threshold matrix used by the image processing apparatus of this embodiment differs from the conventional one shown in FIG. 7(a) in values corresponding to the initial offset values "1". The values corresponding to the initial offset values "0" are the same as those of the conventional threshold matrix.

Figure 14:
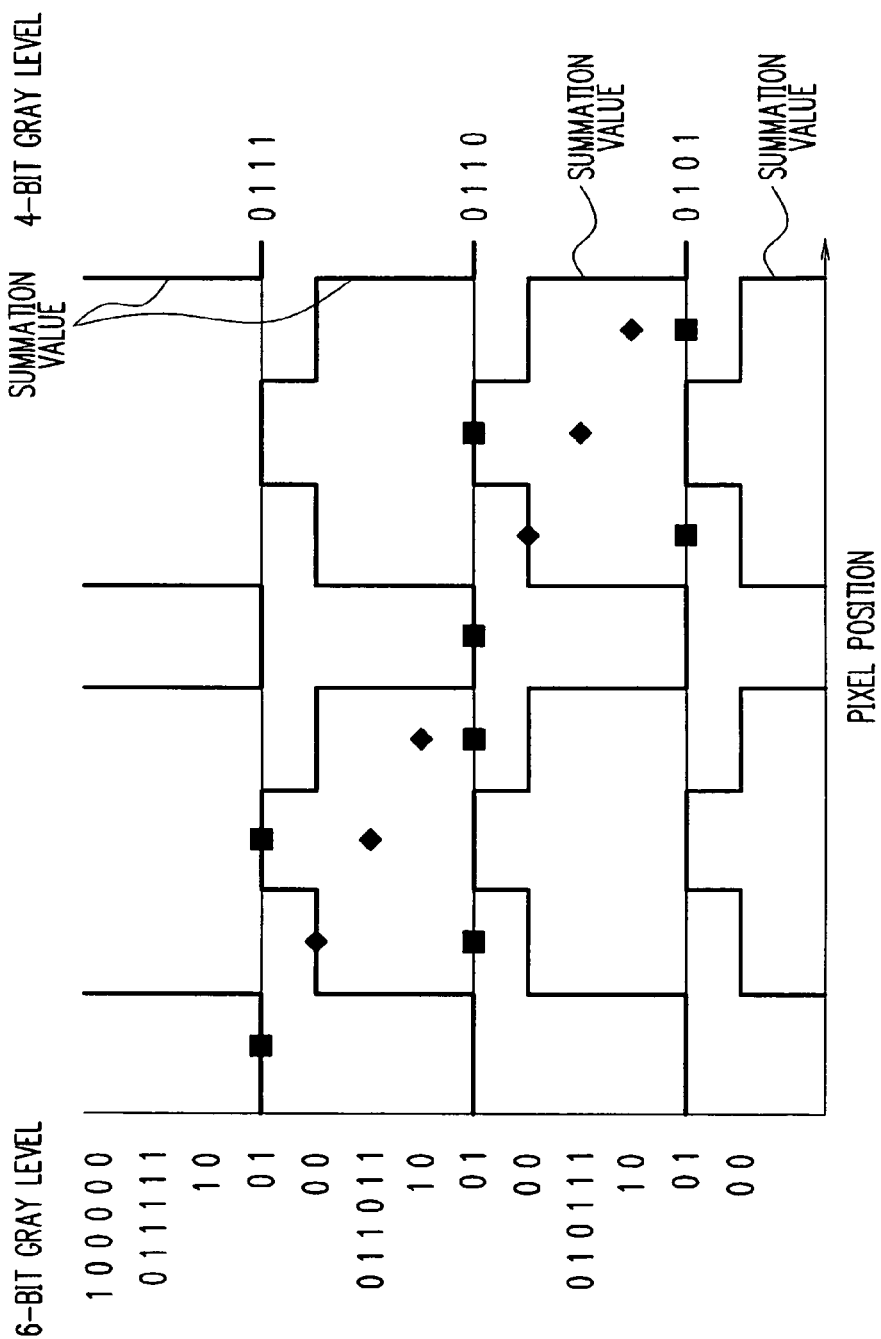
FIG. 14 is a diagram schematically showing the operation of a first image processor of the image processing apparatus depicted in FIG. 11.

FIG. 14 is a diagram schematically showing the operation of the first image processor 4. A description will be hereinafter given of the operation with values 0, 3, 4 and 3 in the first row of the summation matrix shown in FIG. 8.

In FIG. 14, 6-bit input gray level data indicated by the vertical axis on the left side is converted to 4-bit output gray level data indicated on the right side with respect to each pixel (pixel position) indicated by the horizontal axis. For example, "♦" in the fourth pixel position from the left indicates that an input gray level value is "011010". Since the input gray level value is in between summation values "011100" and "011000", the value is truncated to a value indicated by a horizontal line therebetween. On the other hand, "■" indicates output gray level, and in this case, an output gray level value is "0110".

When an input gray level value coincides with a summation value as in the case of the second pixel position from the left (both values are 011100), the value is truncated to an output gray level value (0110) indicated by a horizontal line between the input gray level value and a summation value (011000) smaller than it. Besides, when an input gray level value (011011) is in between summation values (011101 and 011001) with no horizontal line therebetween as in the case of the third pixel position from the left (i.e., each summation value overlaps a horizontal line), the value is converted to a value (0111) indicated by a horizontal line overlapping the summation value (011101) larger than the input gray level value (011011). In other words, from among 4-bit gray level values higher than the input gray level value (011011), a value (0111) closest to the input gray level value is selected as an output gray level value. However, when an input gray level value (011101) overlaps a horizontal line as in the case of the leftmost pixel position, a value (0111) indicated by the horizontal line is selected as an output gray level value.

The above process is performed with respect to each pixel position to thereby convert the 6-bit gray level data of the raster image 1 into 4-bit output gray level data.

Incidentally, when an input gray level value coincides with a summation value, the input gray level value is converted to a 4-bit value that is smaller than and closest to the summation value. In other words, when an input gray level value coincides with a summation value, from among 4-bit gray level values lower than the summation value, a value closest to the summation value is selected as an output gray level value.

In FIG. 14, the first image processor 4 converts 6-bit gray level data to 4-bit gray level data based on a summation value which varies according to the X and Y coordinate values (x, y) of a pixel input therein. After converting an image from 6 to 4 bits per color component in the manner as described above, the first image processor 4 stores in the memory 2 the raster image whose bit-plane number has been reduced.

The second image processor 5 converts the raster image with less bit-plane number read out from the memory 2 to an image with 6 bits per color component, and sends it to the image display 3. The second image processor 5 includes a bit adder 14 and a threshold generator 11B. The threshold generator 11B is of the same construction as the threshold generator 11A.

Figure 15:
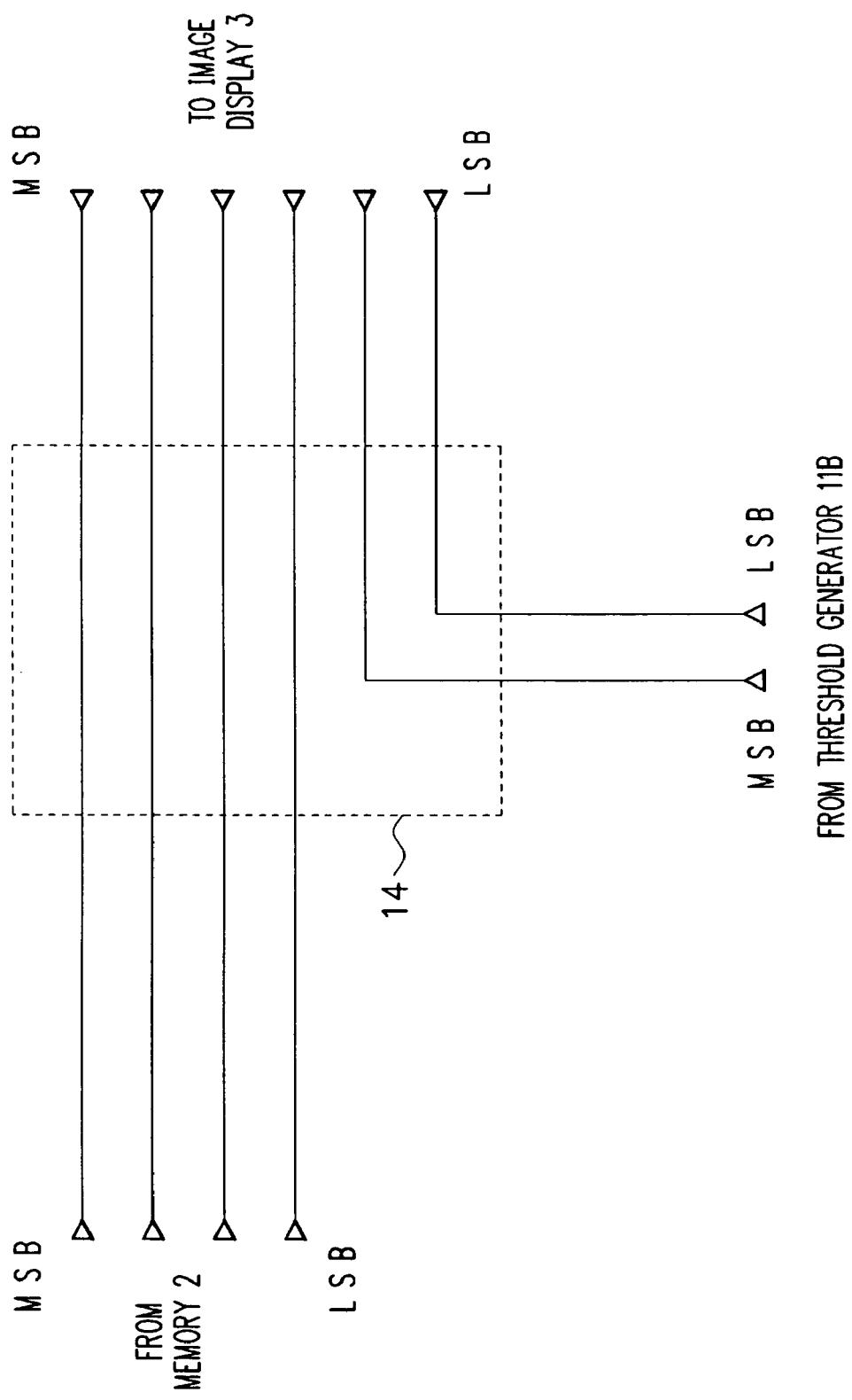
FIG. 15 is a diagram showing the construction of a bit adder of the image processing apparatus depicted in FIG. 11.

FIG. 15 is a circuit diagram showing the internal construction of the bit adder 14.

The bit adder 14 uses a 4-bit signal output from the memory 2 as four high-order bits and a 2-bit signal output from the threshold generator 11B as two low-order bits to produce a 6-bit signal, thus outputting the 6-bit signal to the image display 3.

Figure 16:
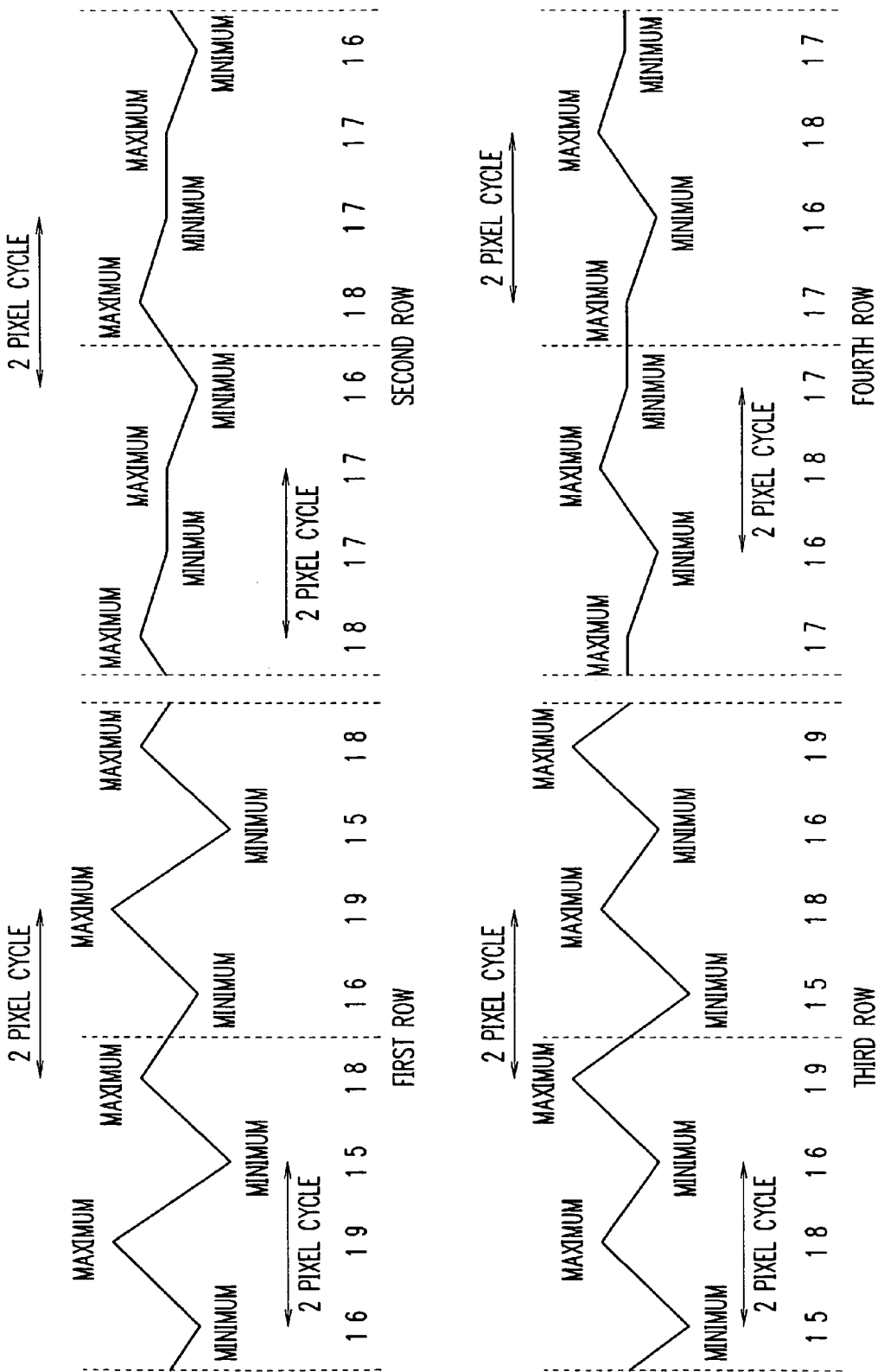
FIG. 16 is a diagram showing that an output signal of the image processing apparatus depicted in FIG. 11 contains no low-frequency noise component.

As shown in FIG. 9, since the average of signal values output to the image display 3 coincides with the signal value of an input image, no gray-level distortion or change occurs. Further, as can be seen in FIG. 16, with respect to the output values, both the maximum and minimum values are arranged for every other pixel. Thereby, the output values contain no low-frequency noise component.

FIG. 17 is a diagram showing combinations of initial threshold values and initial offset values, and the relationship between an input signal (4-bit value) stored in the memory 2 and output signals (6-bit value) for the respective combinations.

In FIG. 17, respective input signals, initial threshold values, initial offset values, and the signal values in the threshold generator are expressed in decimal numbers. Each signal stored in the memory is indicated as a 4-bit gray level value expressed in a decimal number, and each output signal is indicated as a 6-bit gray level value expressed in a decimal number.

As can be seen in FIG. 17, when an input signal indicates a value not less than 2 and not more than 61, the average of output signal values coincides with the input signal value. Thus, no gray-level distortion occurs.

The less difference between the average of output signal values and the input signal value, the less change in color and brightness there is, resulting in excellent gray level reproduction. In comparison with the difference between the average of output signal values and an input signal value according to Reference 1, the difference between the two values is substantially improved in the image processing apparatus of this embodiment. From this it is to be understood that, according to the first embodiment, gray-level distortion: a problem in the conventional techniques, can be suppressed.

As just described, by minimizing the effect on image quality resulting from dithering, it is possible to suppress graininess as well as to avoid false colors in an image.

Additionally, the threshold generator 11B is of the same construction as the threshold generator 11A. Therefore, the image processing apparatus may be provided with only one threshold generator 11, which is switched to serve as the threshold generators 11A and 11B. In this case, control is required to determine whether the output of the threshold generator 11 is input to the second adder 21 or the bit adder 14.

For example, an input/output switch controller provides a selector and a demultiplexer with a control signal. The input/output switch controller selects and outputs "0" as the control signal when feeding the output of the threshold generator 11 to the second adder 21, and selects and outputs "1" when feeding the output to the bit adder 14.

As is described above, in accordance with the first embodiment of the present invention, the image processing apparatus can minimize the effect on image quality as well as requiring less chip area and less electric power.

Second Embodiment

In the following, the second embodiment of the present invention will be described. The image processing apparatus of the second embodiment is in many respects basically similar to that of the first embodiment except for the construction of the bit adder 14.

FIG. 18 is a diagram showing the construction of the bit adder 14 of the image processing apparatus according to the second embodiment of the present invention. With this construction, when a signal with a value of "1111" is input from the memory 2 to the bit adder 14, the bit adder 14 outputs a value of "111111" regardless of the value input therein from the threshold generator 11B. When a signal with a value of "0000" is input from the memory 2 to the bit adder 14, the bit adder 14 outputs a value of "000000" regardless of the value input therein from the threshold generator 11B. Besides, when a signal with a value neither "1111" nor "0000" is input from the memory 2 to the bit adder 14, the bit adder 14 attaches a threshold value (2 bits) input from the threshold generator 11B to the 4-bit signal input from the memory 2 as low-order bits to output a 6-bit signal.

Figure 19:
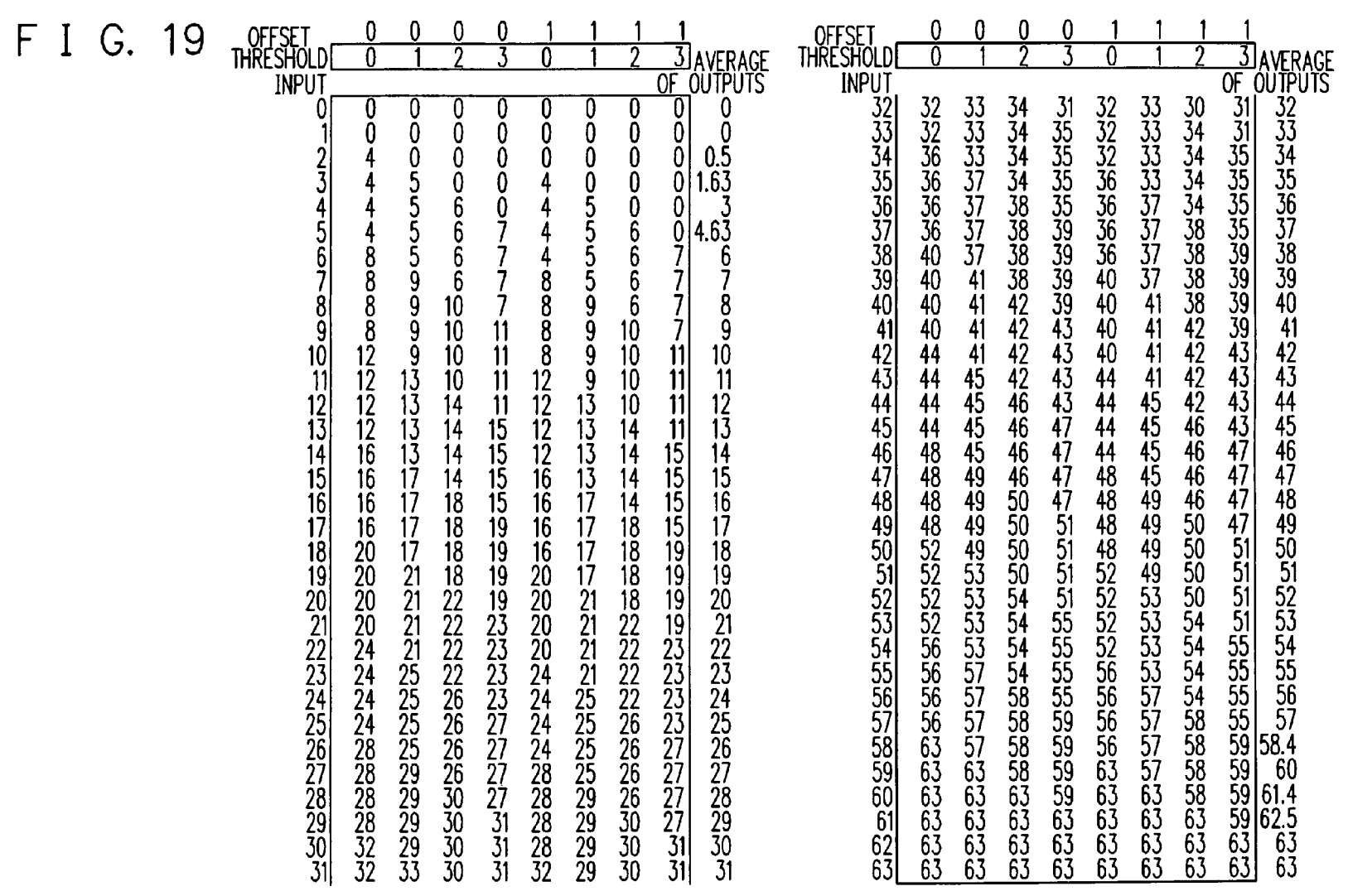

FIG. 19 is a diagram showing combinations of initial threshold values and initial offset values, and the relationship between an input signal (4-bit value) stored in the memory 2 and output signals (6-bit value) for the respective combinations.

In FIG. 19, respective input signals, initial threshold values, initial offset values, and the signal values in the threshold generator are expressed in decimal numbers. Each signal stored in the memory is indicated as a 4-bit gray level value expressed in a decimal number, and each output signal is indicated as a 6-bit gray level value expressed in a decimal number.

As can be seen in FIG. 19, when an input signal indicates a value not less than 6 and not more than 57, the average of output signal values coincides with the input signal value. Thus, no gray-level distortion occurs. In addition, even an input signal is at the highest or maximum gray level "63" or the lowest or minimum gray level "0", the average of output signal values coincides with the input signal value. Therefore, it is possible to prevent so-called "white clipping" and "black crushing".

Third Embodiment

Figure 20:
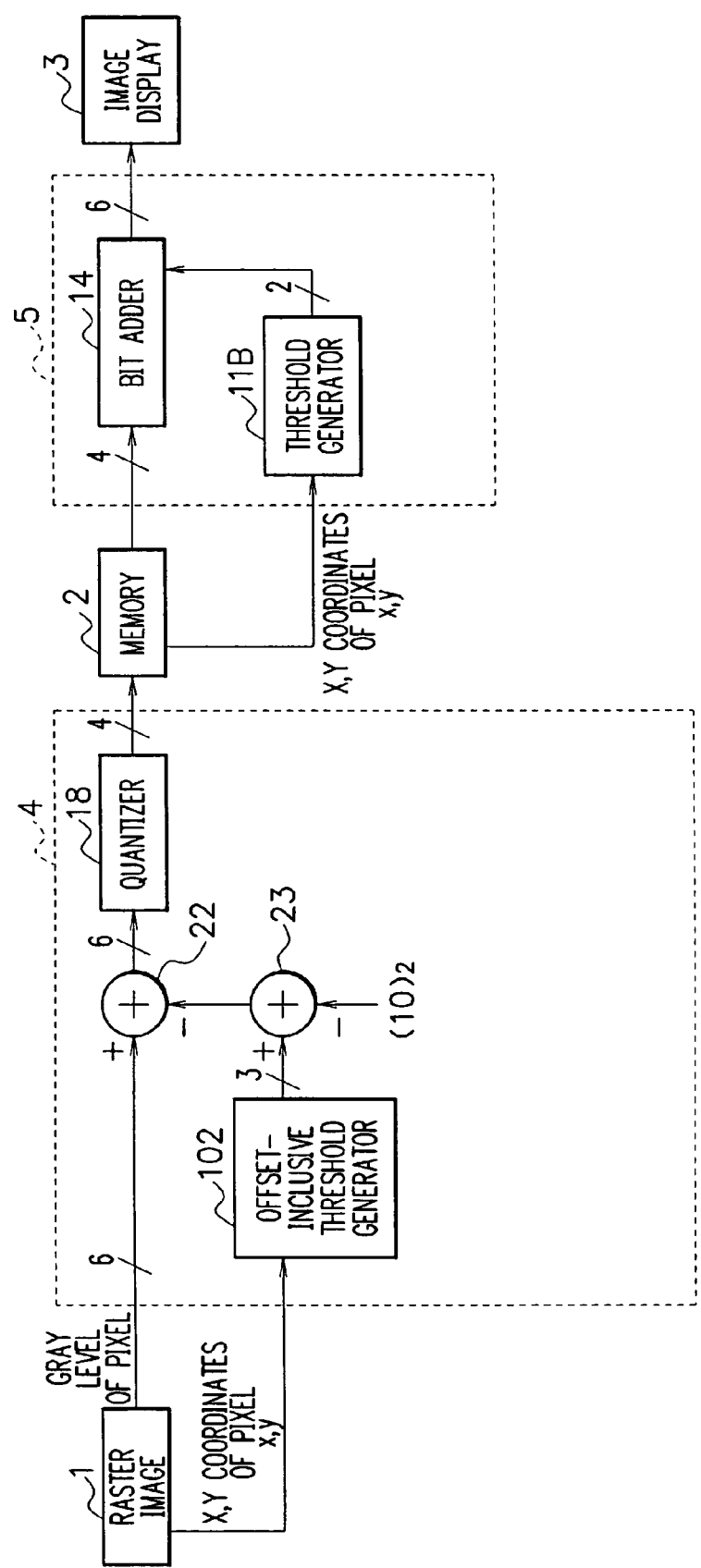
FIG. 20 is a diagram showing the construction of an image processing apparatus according to the third embodiment of the present invention.

In the following, the third embodiment of the present invention will be described. FIG. 20 is a diagram showing the construction of an image processing apparatus according to the third embodiment of the present invention. The image processing apparatus of the third embodiment is in many respects basically similar to that of the first embodiment except for the internal construction of the first image processor 4.

In this embodiment, the first image processor 4 includes an offset-inclusive threshold generator 102, the quantizer 18, the third adder 22 and a fourth adder 23.

The offset-inclusive threshold generator 102 generates an output signal (hereinafter sometimes referred to as offset-inclusive threshold value) based on the X and Y coordinate values (x, y) of a pixel input therein. FIG. 21 is a diagram showing the relationship between input values to the offset-inclusive threshold generator 102 and output values therefrom. In FIG. 21, [X mod 4] indicates the remainder when the X coordinate value (x) of a pixel is divided by 4, while [Y mod 4] indicates the remainder when the Y coordinate value (y) of a pixel is divided by 4. The offset-inclusive threshold generator 102 generates an output value according to the results of [X mod 4] and [Y mod 4].

The offset-inclusive threshold value corresponds to the summation or composite value of an initial offset value and an initial threshold value in the first embodiment. The fourth adder 23 adds a constant offset to the offset-inclusive threshold value. The result of the addition corresponds to the summation value in the first embodiment.

The image processing apparatus of this embodiment otherwise operates in the same manner as that of the first embodiment, and the same description will not be repeated. The image processing apparatus of this embodiment is equivalent in system to that of the first embodiment. Therefore, it is obvious that the same effect can be achieved as in the first embodiment.

A description has been made of the case, as an example, where the offset-inclusive threshold generator 102 generates an offset-inclusive threshold value corresponding to the sum of an initial offset value and an initial threshold value. The first image processor 4 may generate an offset-inclusive threshold value also including a constant offset by the threshold generator 102 to eliminate the need to have the fourth adder 23.

Fourth Embodiment

Figure 22:
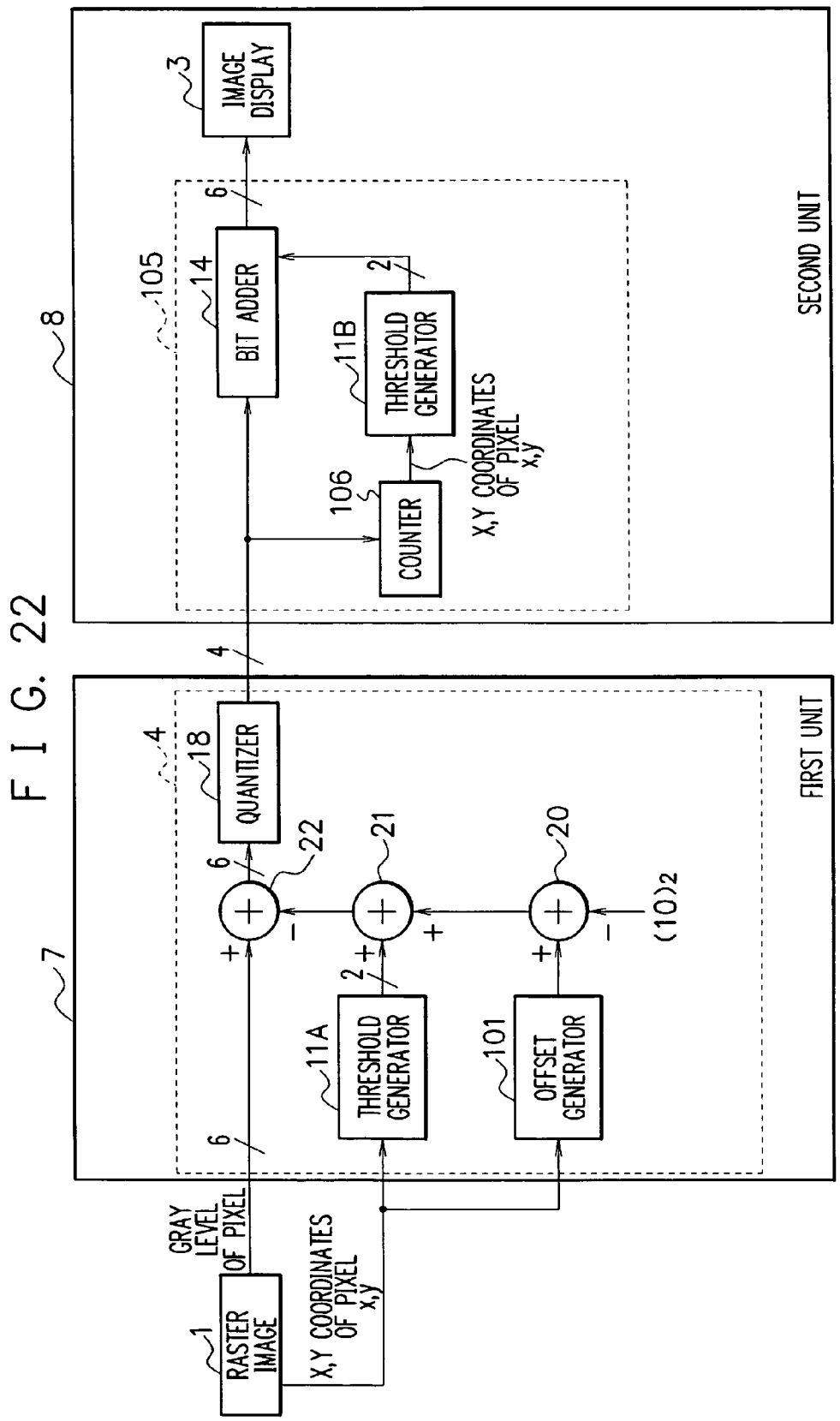
FIG. 22 is a diagram showing the construction of an image transmission apparatus according to the fourth embodiment of the present invention.

In the following, the fourth embodiment of the present invention will be described. FIG. 22 is a diagram showing the construction of an image transmission apparatus according to the fourth embodiment of the present invention. The image transmission apparatus comprises a first unit 7 for transmitting a raster image and a second unit 8 for receiving the raster image. The first unit 7 includes the first image processor 4 which has the same construction as described previously in the respective embodiments. The second unit 8 includes a second image processor 105 and the image display 3.

In the first unit 7, the first image processor 4 converts the raster image 1 with 6 bits per color component to an image with 4 bits per color component to send it to the second unit 8. In the second unit 8, the second image processor 105 restores the raster image received from the first unit 7 to the image with 6 bits per color component to output it to the image display 3.

The second image processor 105 is provided with the bit adder 14, a counter 106, and the threshold generator 11B. The bit adder 14 and the threshold generator 11B have the same construction as described previously for the first embodiment.

The counter 106 operates in response to pixel data transmitted serially from the first unit 7 to specify the X and Y coordinates of a pixel based on a counter value. The counter 106 outputs the X and Y coordinates (x, y) of the pixel to the threshold generator 11B.

For transmitting an image, the first unit 7 transmits pixel data in prescribed order. Accordingly, the X and Y coordinates of a pixel can be specified based on a counter value obtained by the counter 106.

By virtue of this construction, the first unit 7 can send a raster image to the second unit 8 with less transmission capacity while hardly causing deterioration in picture quality. This is advantageous when there is insufficient transmission capacity or the number of transmission buses is reduced.

For example, in the case of transmitting a raster image with 6 bits per color component (18 bits in total) between units having a transmission bus for transmitting/receiving images which is only 16 bits wide, the bit-plane number of the raster image is reduced at the transmitting end so that the image with less bit-plane number can be transmitted via the transmission bus, and thereafter, the bit-plane number of the image is increased at the receiving end. Thereby, it is possible to transmit the respective color components of the image comparable in quality to the original image in parallel.

Fifth Embodiment

Figure 23:
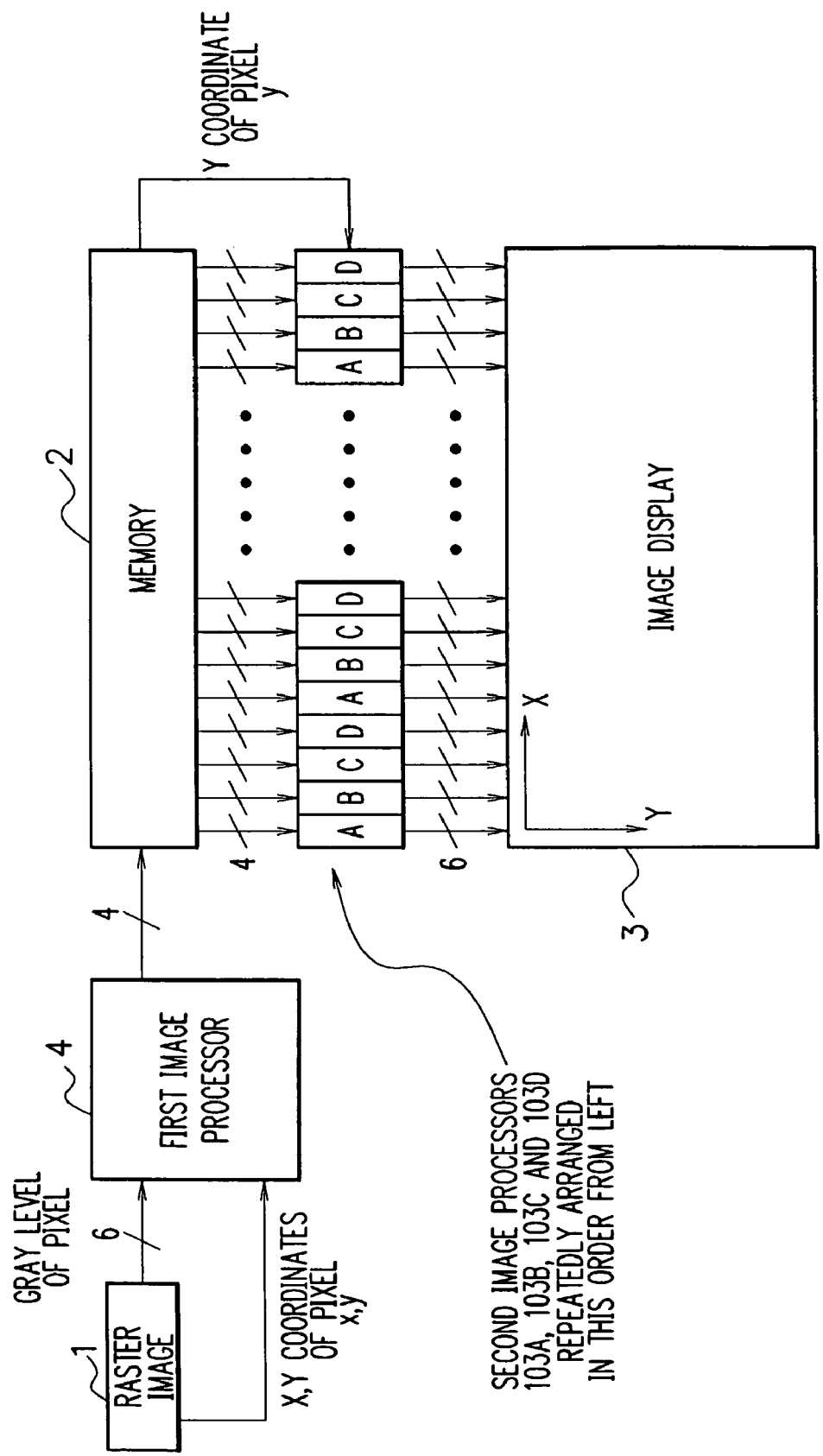
FIG. 23 is a diagram showing the construction of a display according to the fifth embodiment of the present invention.

In the following, the fifth embodiment of the present invention will be described. FIG. 23 is a diagram showing the construction of a display according to the fifth embodiment of the present invention. Referring to FIG. 23, the display comprises the memory 2, the image display 3, the first image processor 4, and second image processors 103A to 103D.

The first image processor 4 processes an RGB raster image 1 with 6 bits per color component output from a computer to store a raster image with 4 bits per color component in the memory 2. The image data stored in the memory 2 are output to the second image processors 103A to 103D with respect to each line, and the raster image with 4 bits per color component is converted to an image with 6 bits per color component therein. Thus, the image display 3 capable of 6-bit display displays the image.

The second image processors 103A to 103D are arranged from the origin side in order, such as 103A, 103B, 103C, 103D, 103A, 103B, ..., 103D, correspondingly to respective pixels in the main scanning direction of the image display 3. Assuming, for example, that the image display 3 has 240 pixels in X direction, a total of 60 sets of the second image processors 103A to 103D are arranged in parallel.

Each of the second image processors 103A to 103D receives as input the Y coordinate value (y) of a pixel from the memory 2.

The second image processors 103A to 103D are provided with threshold generators 104A to 104D each having different internal construction, respectively. The threshold generators 104A to 104D differ from each other in the relationship between input values thereto and output values therefrom. Otherwise the second image processors 103A to 103D have basically the same construction and thus will be described as a generalized second image processor 103X. Besides, the threshold generators 104A to 104D will be described as a generalized threshold generator 104X. Incidentally, "X" of the reference characters 103X and 104X indicates A, B, C or D.

Figure 24:
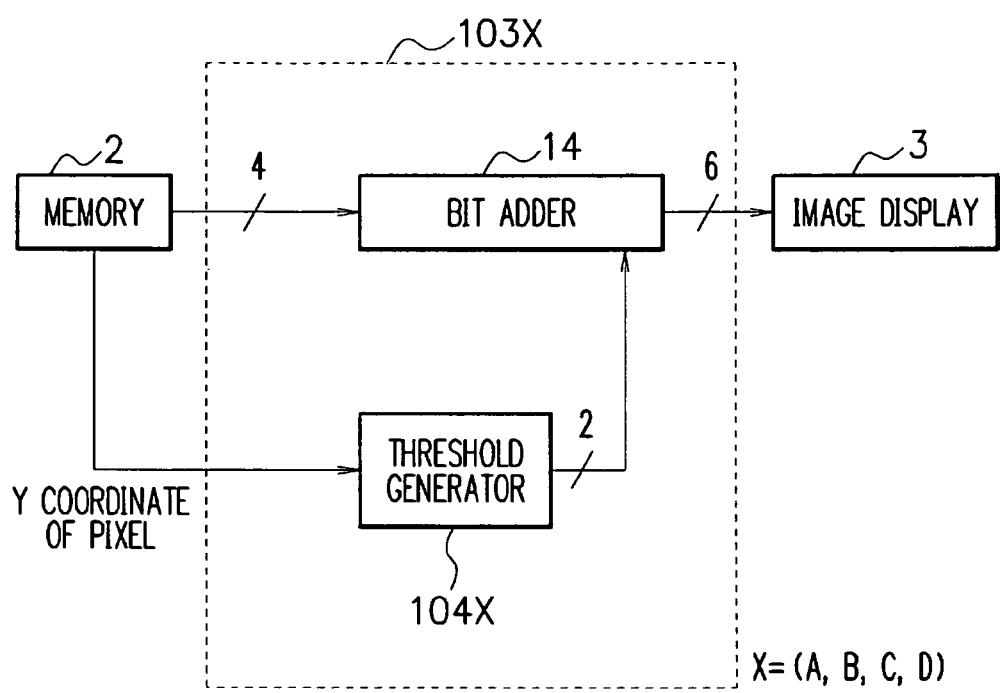
FIG. 24 is a diagram showing the construction of a second image processor of the display depicted in FIG. 23.

FIG. 24 is a diagram showing the construction of the second image processor 103X. The threshold generator 104X generates an output signal based on the Y coordinate value (y) of a pixel input therein. In FIG. 25(a), [Y mod 4] indicates the remainder when the Y coordinate value (y) of a pixel is divided by 4. The threshold generator 104X generates an output value according to the results of [Y mod 4].

As shown in FIG. 25(b), the output values of the threshold generator 104X correspond to initial threshold values in each column generated by the threshold generator 104A.

In accordance with the fifth embodiment of the present invention, the display is provided with the second image processors 103X arranged in parallel corresponding to one line of the image display 3. By virtue of this construction, pixel data for one line output from the memory 2 can be sent to the image display 3 without being latched. Thus, there is no need for a circuit to latch pixel data, and the circuit size can be reduced.

Sixth Embodiment

Figure 26:
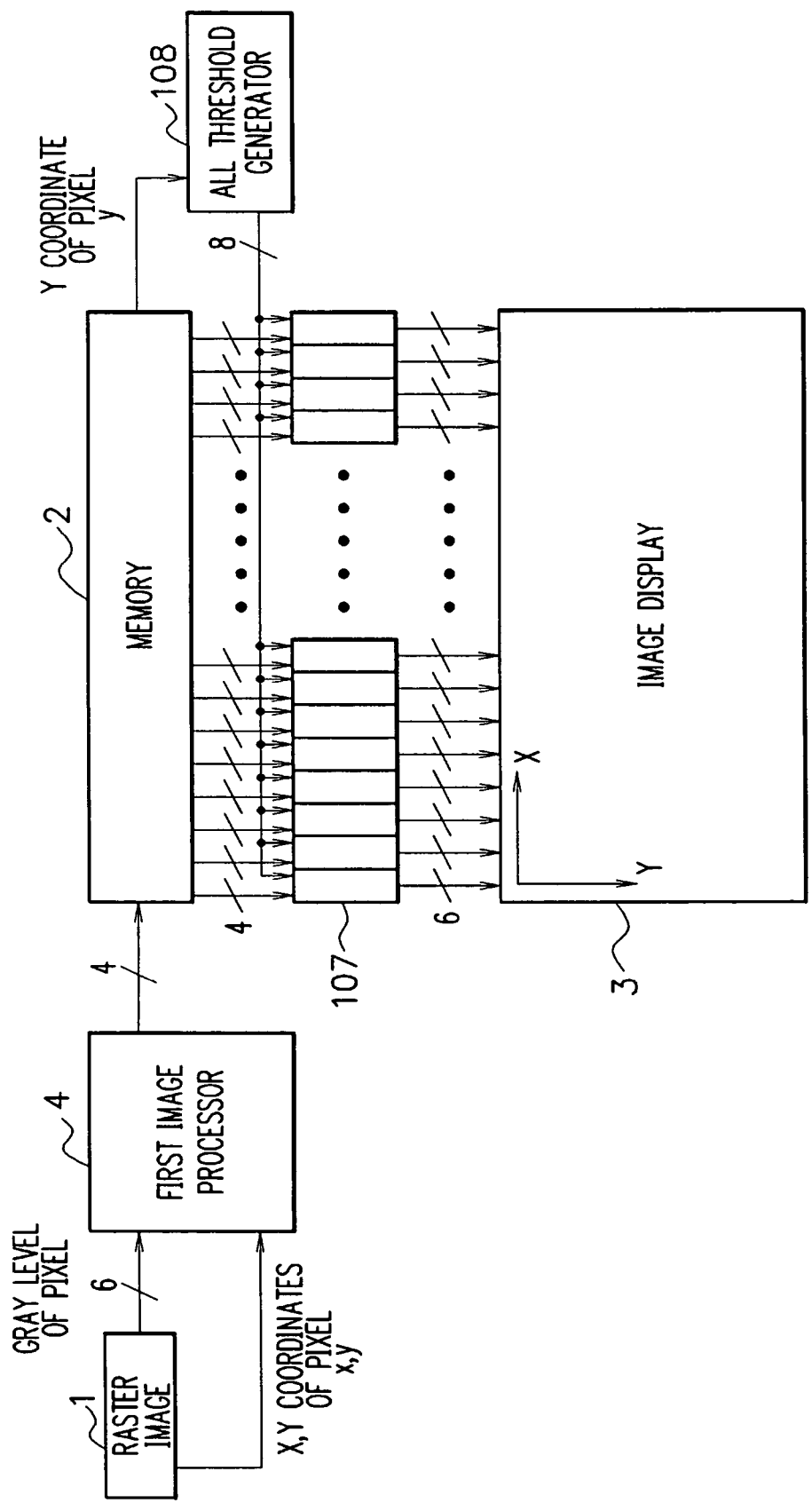
FIG. 26 is a diagram showing the construction of a display according to the sixth embodiment of the present invention.

In the following, the sixth embodiment of the present invention will be described. FIG. 26 is a diagram showing the construction of a display according to the sixth embodiment of the present invention. Referring to FIG. 26, the display comprises the memory 2, the image display 3, the first image processor 4, second image processors 107 and an all threshold generator 108.

The display of the sixth embodiment operates in much the same manner as that of the fifth embodiment. That is, the first image processor 4 processes an RGB raster image 1 with 6 bits per color component output from a computer to store a raster image with 4 bits per color component in the memory 2. The image data stored in the memory 2 are output to the second image processors 107 with respect to each line, and the raster image with 4 bits per color component is converted to an image with 6 bits per color component therein. Thus, the image display 3 capable of 6-bit display displays the image.

The second image processors 107 are arranged correspondingly to respective pixels in the main scanning direction of the image display 3. Assuming, for example, that the image display 3 has 240 pixels in X direction, a total of 240 second image processors 107 are arranged in parallel.

FIG. 27 is a diagram showing the construction of the second image processor 107. The second image processor 107 includes the bit adder 14. In this embodiment, the bit adder 14 adds a 2-bit threshold value received from the all threshold generator 108 to 4-bit pixel data from the memory 2.

Figure 28:
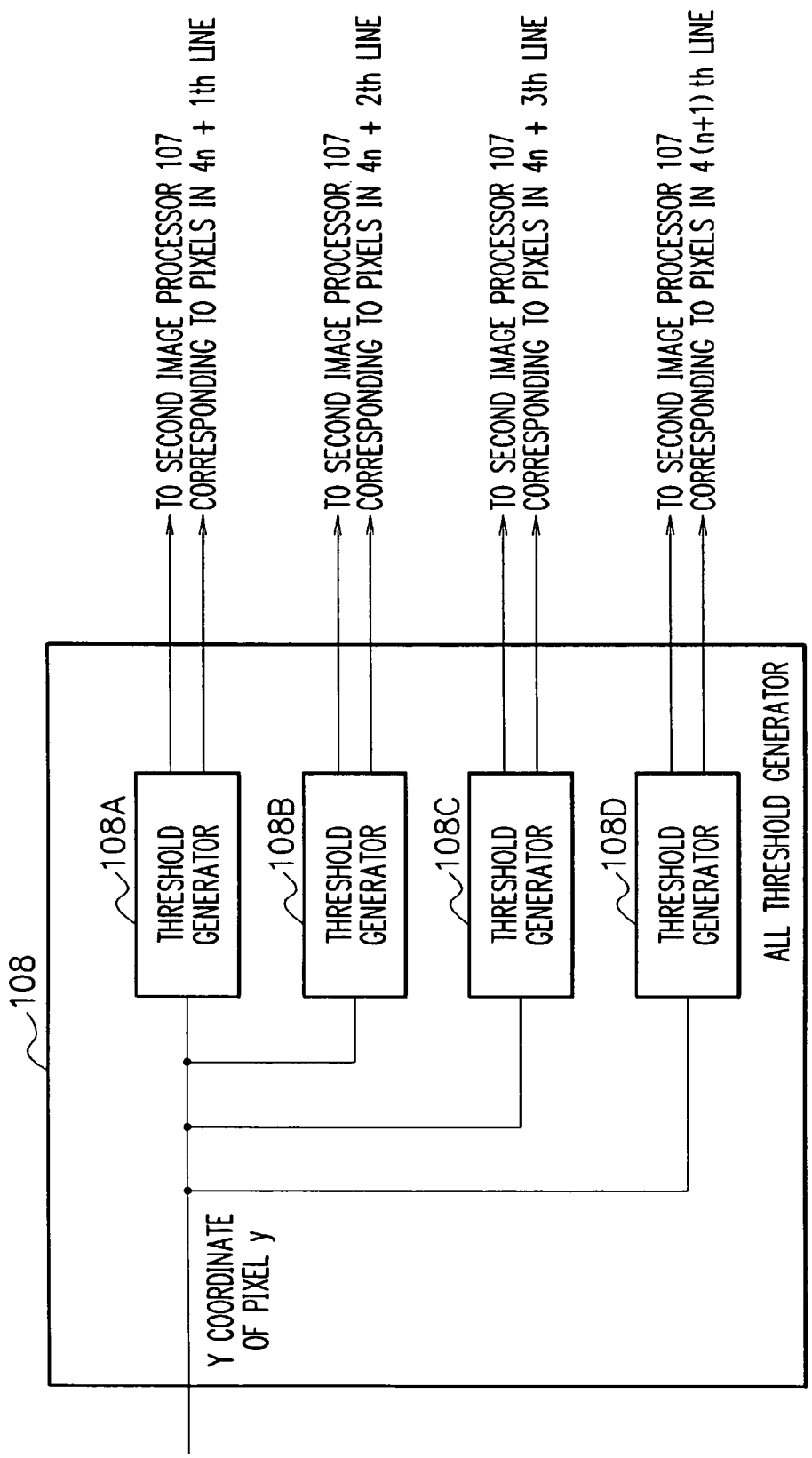
FIG. 28 is a diagram showing the construction of an all threshold generator of the display depicted in FIG. 26.

FIG. 28 is a diagram showing the construction of the all threshold generator 108. The all threshold generator 108 is provided with threshold generators 108A to 108D. FIG. 29 is a diagram showing the relationship between input values to the respective threshold generators 108A to 108D and output values therefrom. As can be seen in FIG. 29, the relationship between the input and output of the respective threshold generators 108A to 108D corresponds to that of the threshold generators 104X shown in FIG. 25.

Figure 30:
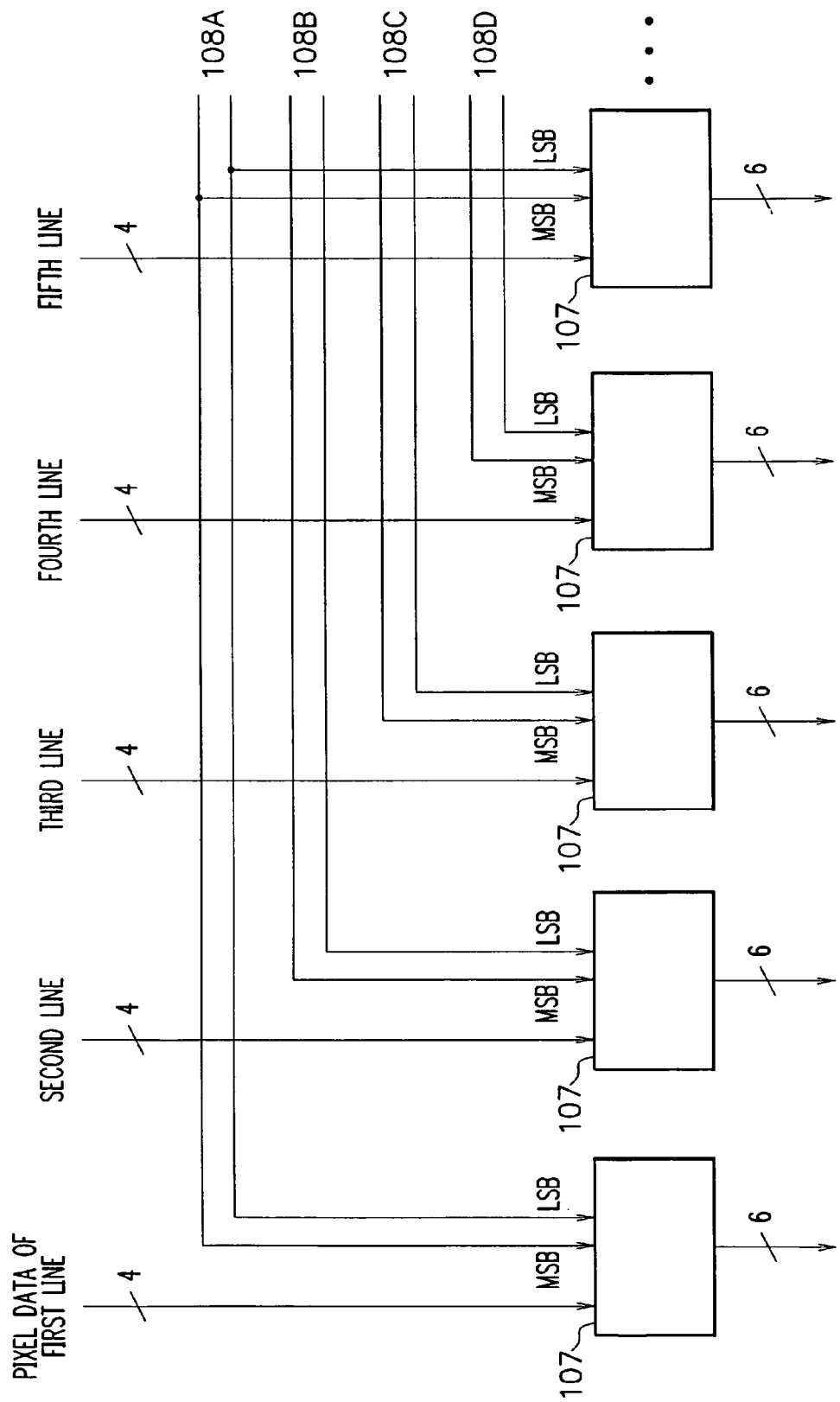
FIG. 30 is a diagram showing connections between the all threshold generator and the second image processors in the display depicted in FIG. 26.

FIG. 30 is a diagram showing connections between the all threshold generator 108 and the second image processors 107. The same connection is made for every four second image processors 107. More specifically, the second image processor 107 corresponding to pixels in 4n+1th (n: an arbitrary integer 0 or more) line or column is connected to the threshold generator 108A. The second image processor 107 corresponding to pixels in 4n+2th line is connected to the threshold generator 108B. The second image processor 107 corresponding to pixels in 4n+3th line is connected to the threshold generator 108C. The second image processor 107 corresponding to pixels in 4(n+1)th line is connected to the threshold generator 108D.

In accordance with the sixth embodiment of the present invention, the display is provided with the all threshold generator 108. By virtue of this construction, the degree of increase in circuit size can be reduced even if the display includes second image processors arranged in parallel.

Seventh Embodiment

Figure 31:
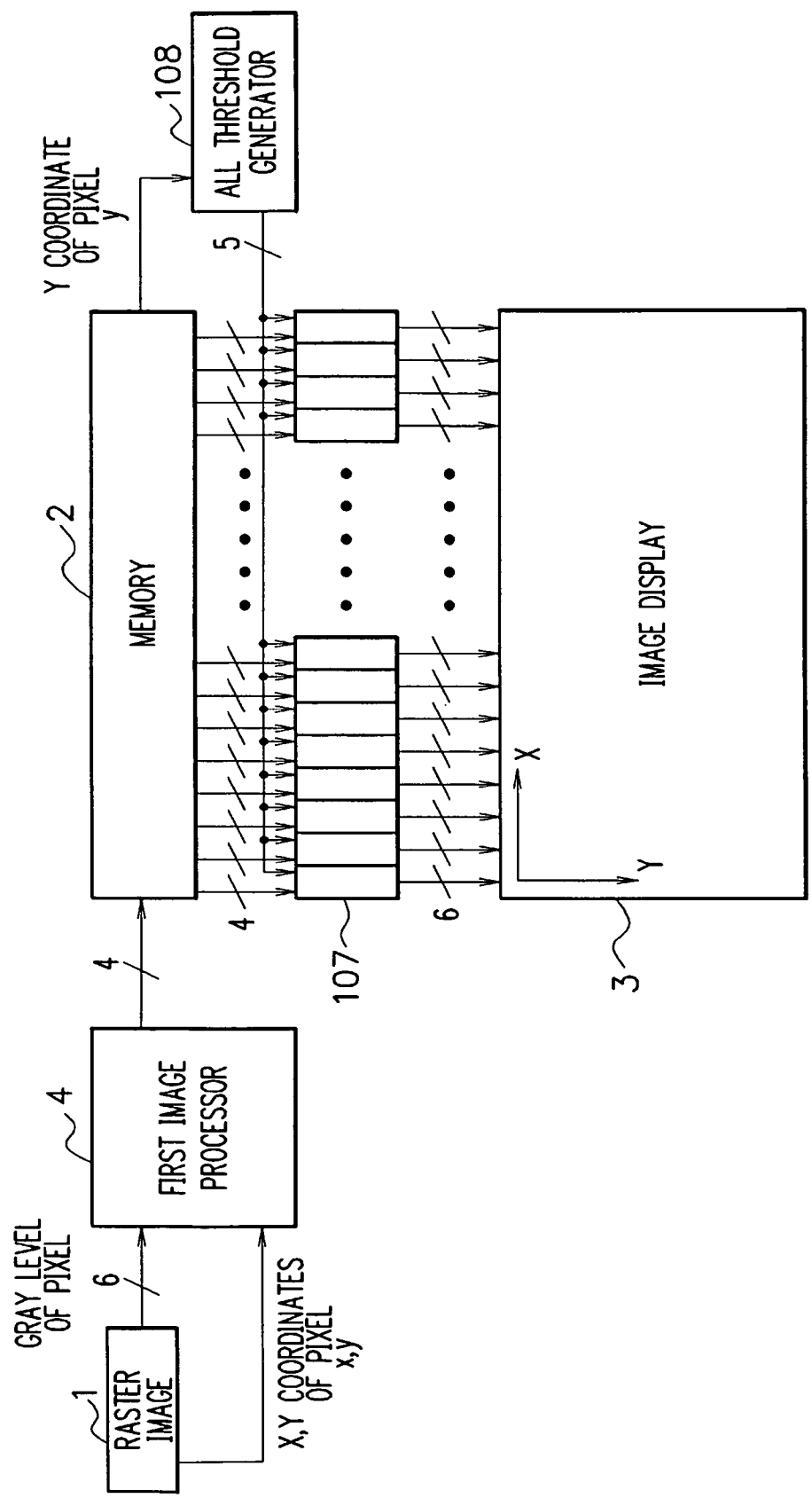
FIG. 31 is a diagram showing the construction of a display according to the seventh embodiment of the present invention.

In the following, the seventh embodiment of the present invention will be described. FIG. 31 is a diagram showing the construction of a display according to the seventh embodiment of the present invention. The display of the seventh embodiment is in many respects basically similar to that of the sixth embodiment except for the internal construction of the all threshold generator 108. The all threshold generator 108 outputs 5-bit data.

Figures 32, 33:
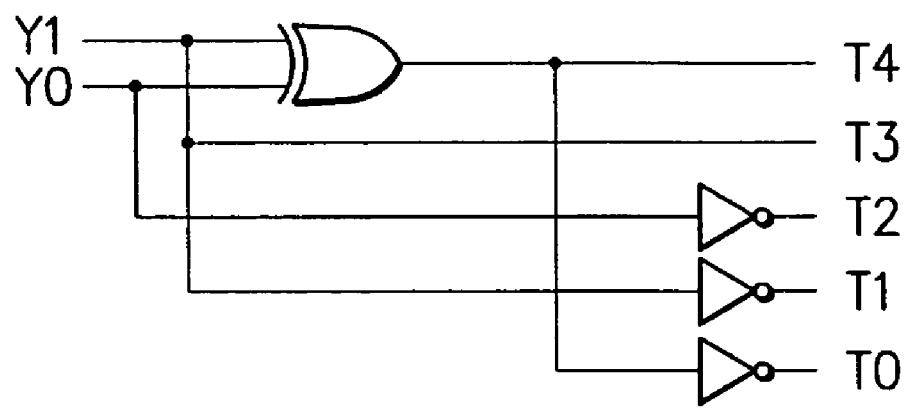
FIG. 32 is a diagram showing the construction of an all threshold generator of the display depicted in FIG. 31.
FIG. 33 is a diagram showing the relationship between input values to the all threshold generator and output values therefrom in the display depicted in FIG. 31.

FIG. 32 is a diagram showing the construction of the all threshold generator 108 of this embodiment. In FIG. 32, Y1 indicates a high-order bit of the Y coordinate of a pixel, while Y0 indicates a low-order bit of the Y coordinate of the pixel. T4, T3, T2, T1 and T0 indicate respective digits of a 5-bit signal output from the all threshold generator 108, T4 indicating the highest-order bit and T0 indicating the lowest-order bit.

The all threshold generator 108 generates an output signal based on the Y coordinate value (y) of a pixel input therein. In FIG. 33, [Y mod 4] indicates the remainder when the Y coordinate value (y) of a pixel is divided by 4. T[4, 3, 2, 1, 0] indicates the digits (T4, T3, T2, T1 and T0) of a 5-bit output signal in decreasing order from the highest-order bit.

Figure 34:
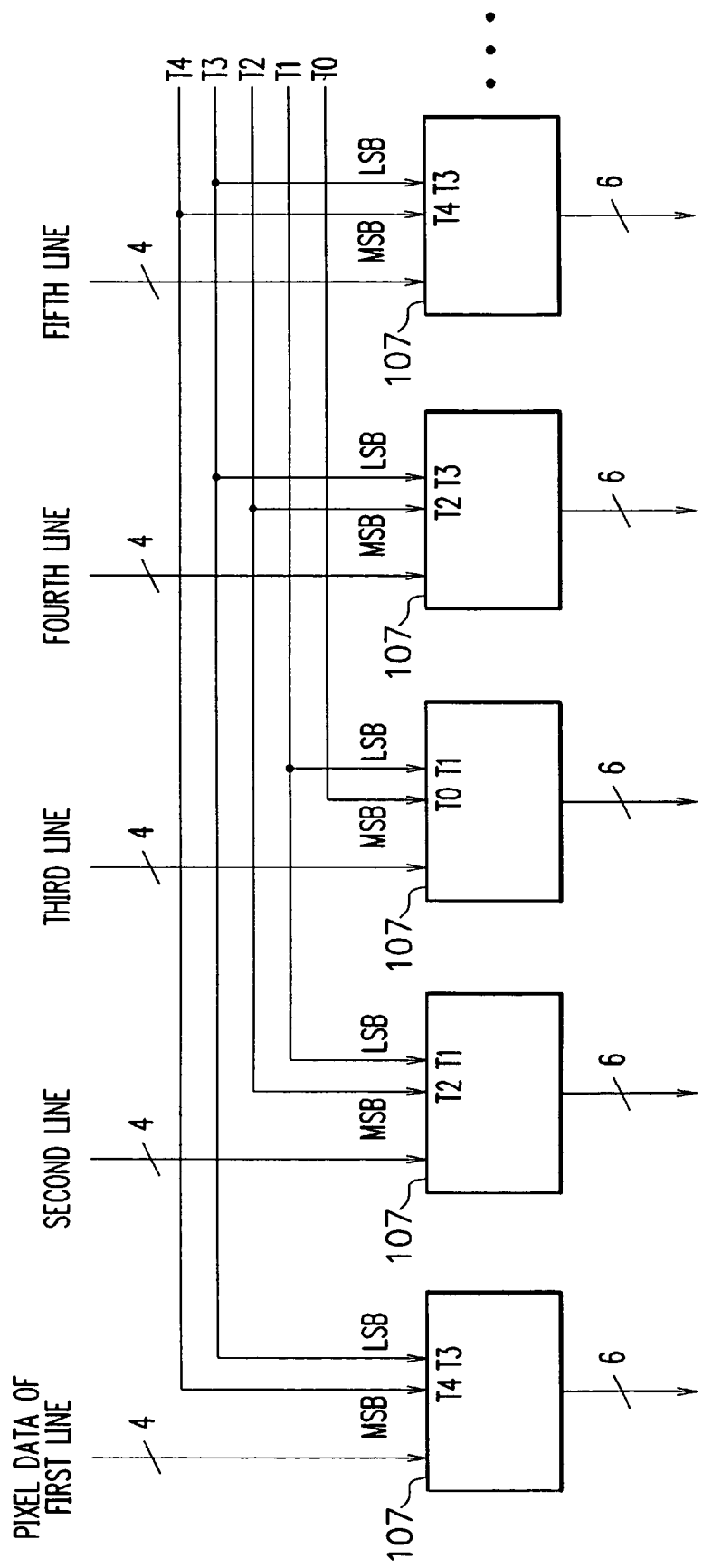
FIG. 34 is a diagram showing connections between the all threshold generator and the second image processor in the display depicted in FIG. 31.

FIG. 34 is a diagram showing connections between the all threshold generator 108 and the second image processors 107. The same connection is made for every four second image processors 107. More specifically, the second image processor 107 corresponding to pixels in 4n+1th (n: an arbitrary integer 0 or more) line or column is connected to the all threshold generator 108 with T4 as MSB and T3 as LSB. The second image processor 107 corresponding to pixels in 4n+2th line is connected to the all threshold generator 108 with T2 as MSB and T1 as LSB. The second image processor 107 corresponding to pixels in 4n+3th line is connected to the all threshold generator 108 with T0 as MSB and T1 as LSB.

The second image processor 107 corresponding to pixels in 4(n+1)th line is connected to the all threshold generator 108 with T2 as MSB and T3 as LSB.

FIG. 35 is a diagram showing the relationship between input values to the all threshold generator 108 and output values therefrom. As can be seen in FIG. 35, threshold value data sent from the all threshold generator 108 to the respective second image processors 107 correspond to that of the threshold generators 104X of the fifth embodiment. Consequently, pixel data for one line output from the memory 2 can be displayed on the image display 3 without being latched.

Moreover, in accordance with the seventh embodiment of the present invention, the all threshold generator 108 need not have four threshold generators (108A to 108D) differently from that of the sixth embodiment. Additionally, only five wirings suffice to connect the all threshold generator 108 to the respective second image processors 107 (eight wirings are required in the sixth embodiment). Thus, circuit size can be further reduced as compared to the sixth embodiment with the same advantages.

Eighth Embodiment

In the following, the eighth embodiment of the present invention will be described. FIG. 36 is a diagram showing the construction of an apparatus to which is applied an image processing method of the eighth embodiment. Image processing may be performed by software with a computer. That is, as shown in FIG. 36, the first image processor 4 and the second image processor 5 may be implemented through software with the actual use of a computer.

Figure 38:
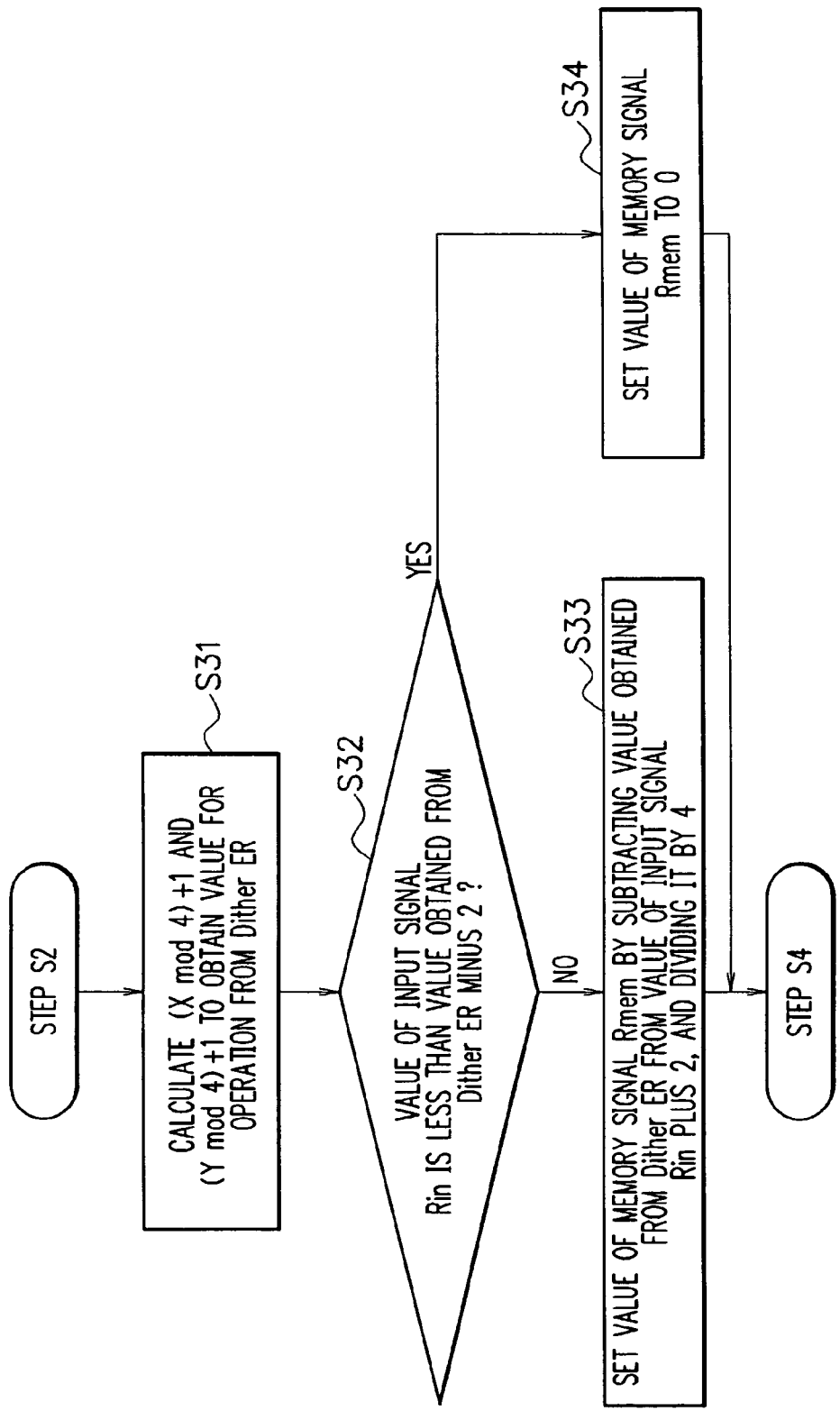
FIG. 38 is a flowchart showing dithering operation according to the image processing method of the eighth embodiment.
Figure 39:
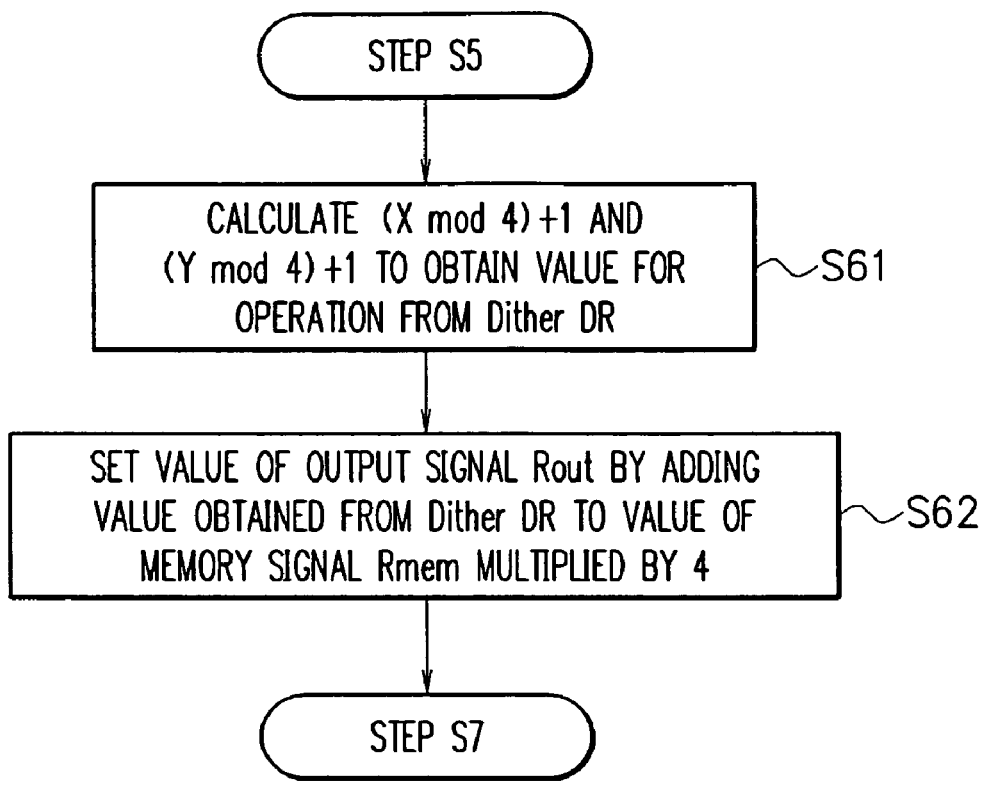
FIG. 39 is a flowchart showing bit addition operation according to the image processing method of the eighth embodiment.

FIG. 37 is a flowchart showing operation according to the image processing method of the eighth embodiment. Referring to FIG. 37, the bit-plane number of a raster image 1 is reduced from 6 bits to 4 bits, and the image 1 is once stored in the memory 2. The bit-plane number of the image signal read out from the memory 2 is increased to 6 bits before the raster image 1 is displayed on the image display 3. The process in step S3 is performed by the first image processor 4, and the process in step S6 is performed by the second image processor 5. FIG. 38 is a flowchart showing the operation of the first image processor 4. FIG. 39 is a flowchart showing the operation of the second image processor 5.

When the image signal Rin (6 bits) of the raster image 1 is input to an image processing apparatus (step S1), information on a pixel corresponding to the input image signal (i.e., X and Y coordinates of the pixel) is extracted (step S2).

The first image processor 4 determines a signal Rmem (4 bits) output to the memory 2 based on the X and Y coordinates of the pixel as follows (step S3):

The first image processor 4 calculates ((X mod 4)+1) and ((Y mod 4)+1) to obtain a value in the ((X mod 4)+1)th column and the ((Y mod 4)+1)th row from DitherER (the summation matrix shown in FIG. 8) (step S31)

If the value of Rin is equal to or larger than a value obtained by subtracting a constant offset from DitherER (DitherER−2) (step S32/No), the first image processor 4 subtracts (DitherER−2) from the value of Rin (Rin+2−DitherER), and divides (Rin+2−DitherER) by 4, thus defining the quantized value as the value of Rmem (step S33)

If the value of Rin is less than (DitherER−2) (step S32/Yes), the first image processor 4 defines 0 (zero) as the value of Rmem (step S34)

The memory signal Rmem obtained as above is stored in the memory 2 (step S4).

After that, the memory signal Rmem is output from the memory 2 to the second image processor 5 together with the information on the pixel corresponding to the memory signal or image signal (i.e., X and Y coordinates of the pixel) (step S5).

The second image processor 5 determines an output signal (raster image) Rout (6 bits) output to the image display 3 based on the X and Y coordinates of the pixel as follows (step S6):

The second image processor 5 calculates ((X mod 4)+1) and ((Y mod 4)+1) to obtain a value in the ((X mod 4)+1)th column and the ((Y mod 4)+1)th row from DitherDR (the threshold matrix shown in FIG. 8) (step S61)

The second image processor 5 multiplies the value of Rmem by 4, and adds the value obtained from DitherDR to the multiplied value (step S62)

The output signal Rout (6 bits) obtained as above is output to the image display 3 (step S7).

If the process in steps S3 and S6 is performed by software with a computer, the same image processing as performed by the image processing apparatus of the first embodiment can be implemented without any special hardware.

While the flowchart of FIG. 37 shows the same image processing as performed by the image processing apparatus of the first embodiment, the same image processing as performed by the image processing apparatus of the second embodiment can be implemented by software with a computer.

Figure 40:
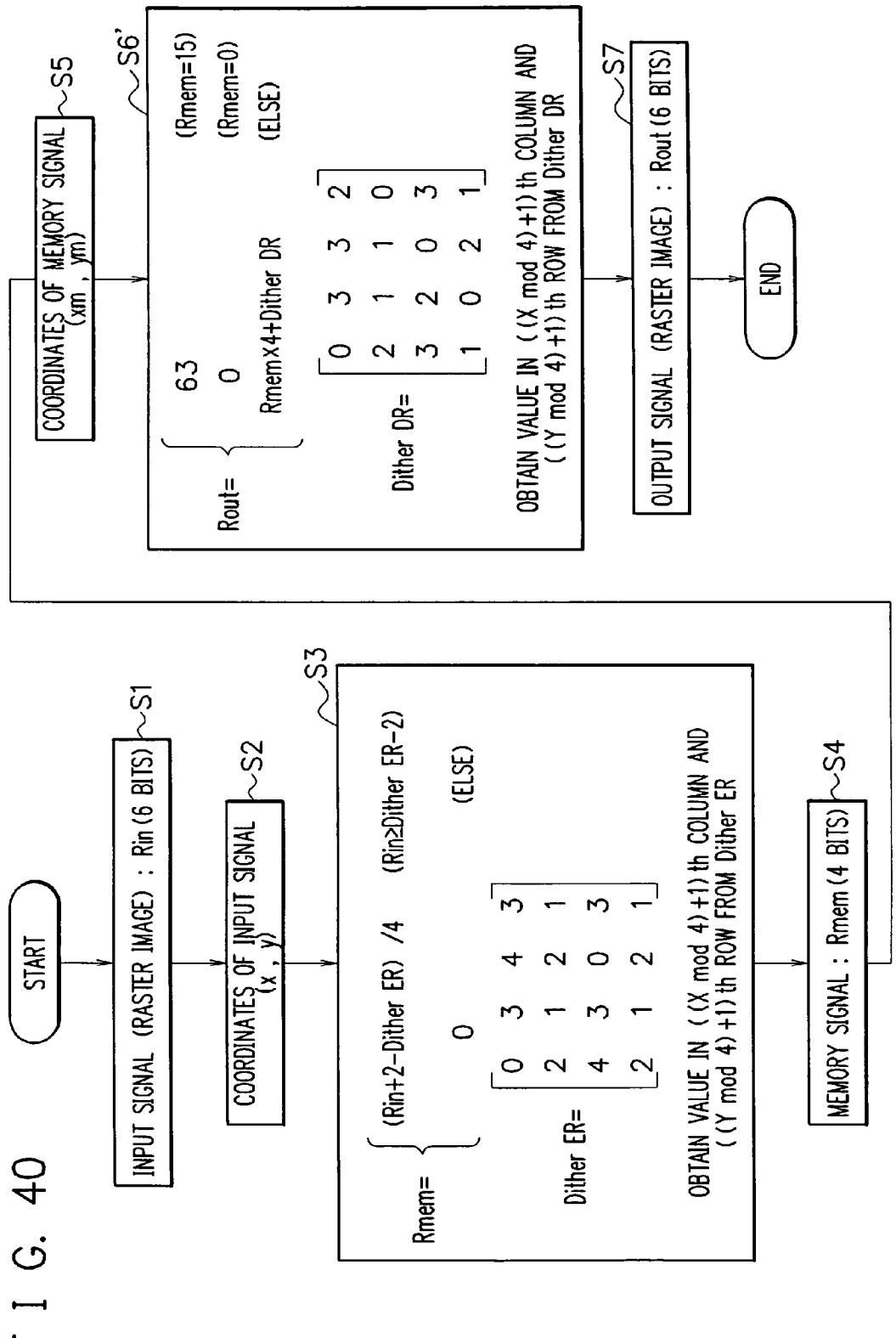
FIG. 40 is a flowchart showing the same image processing operation as performed by the image processing apparatus of the second embodiment.
Figure 41:
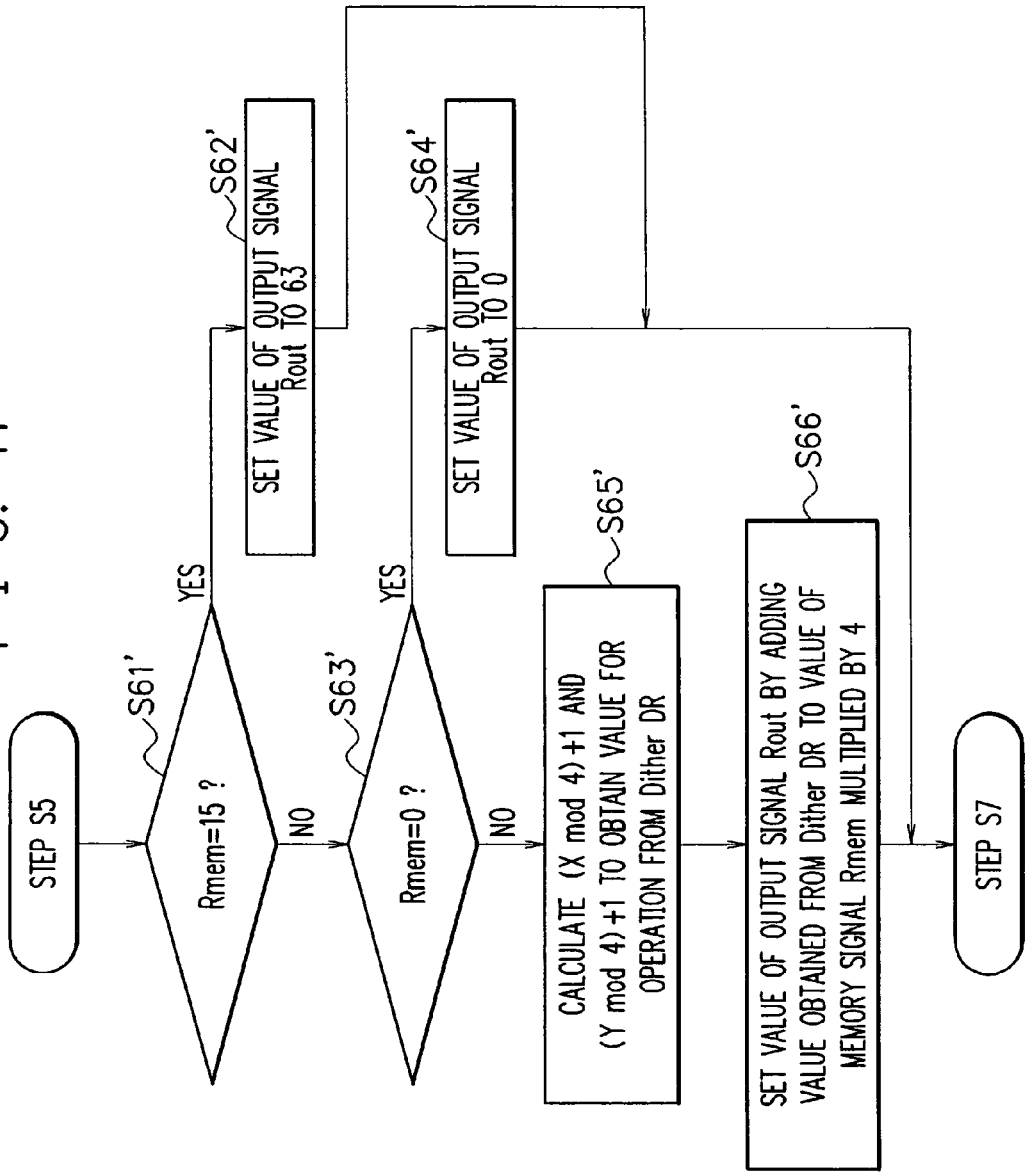
FIG. 41 is a flowchart showing the same bit addition operation as performed by the image processing apparatus of the second embodiment.

FIG. 40 is a flowchart showing the same image processing as performed by the image processing apparatus of the second embodiment. The process in steps S1 through S5 and S7 is the same as that of FIG. 37. FIG. 41 is a flowchart showing the process in step S6' in detail. The second image processor 5 determines an output signal Rout (6 bits) as follows (step S6'):

If Rmem=15 (step S61'/Yes), Rout=63 (step S62')

If Rmem=0 (step S61'/No, step S63'/Yes), Rout=0 (step S64')

If Rmem≠15 (step S61'/No) and also Rmem≠0 (step S63'/No), the second image processor 5 calculates ((X mod 4)+1) and ((Y mod 4)+1) to obtain a value in the ((X mod 4)+1)th column and the ((Y mod 4)+1)th row from DitherDR (the threshold matrix shown in FIG. 8) (step S65')

The second image processor 5 multiplies the value of Rmem by 4, and adds the value obtained from DitherDR to the multiplied value (step S66')

If the process in steps S3 and S6' is performed by software with a computer, the same image processing as performed by the image processing apparatus of the second embodiment can be implemented without any special hardware.

While a description has been given of the case where the operation of both the first image processor 4 and the second image processor 5 is performed through software, the operation of only one of them may be performed by software with a computer.

In addition, in the eighth embodiment, the first image processor and the second image processor of the image processing apparatus are implemented by software with a computer. Similarly, the first image processor and the second image processor of the image transmission apparatus or the display can be implemented by software with a computer.

Ninth Embodiment

In the following, the ninth embodiment of the present invention will be described. In the previous embodiments, the bit-plane number of a raster image is reduced from 6 bits to 4 bits, and after that, the reduced bit-plane number is increased to 6 bits. However, the bit-plane numbers before and after processing are not limited to those numbers. In this embodiment, the number of reduced bit-planes is different from that in the previous embodiments.

Figure 42:
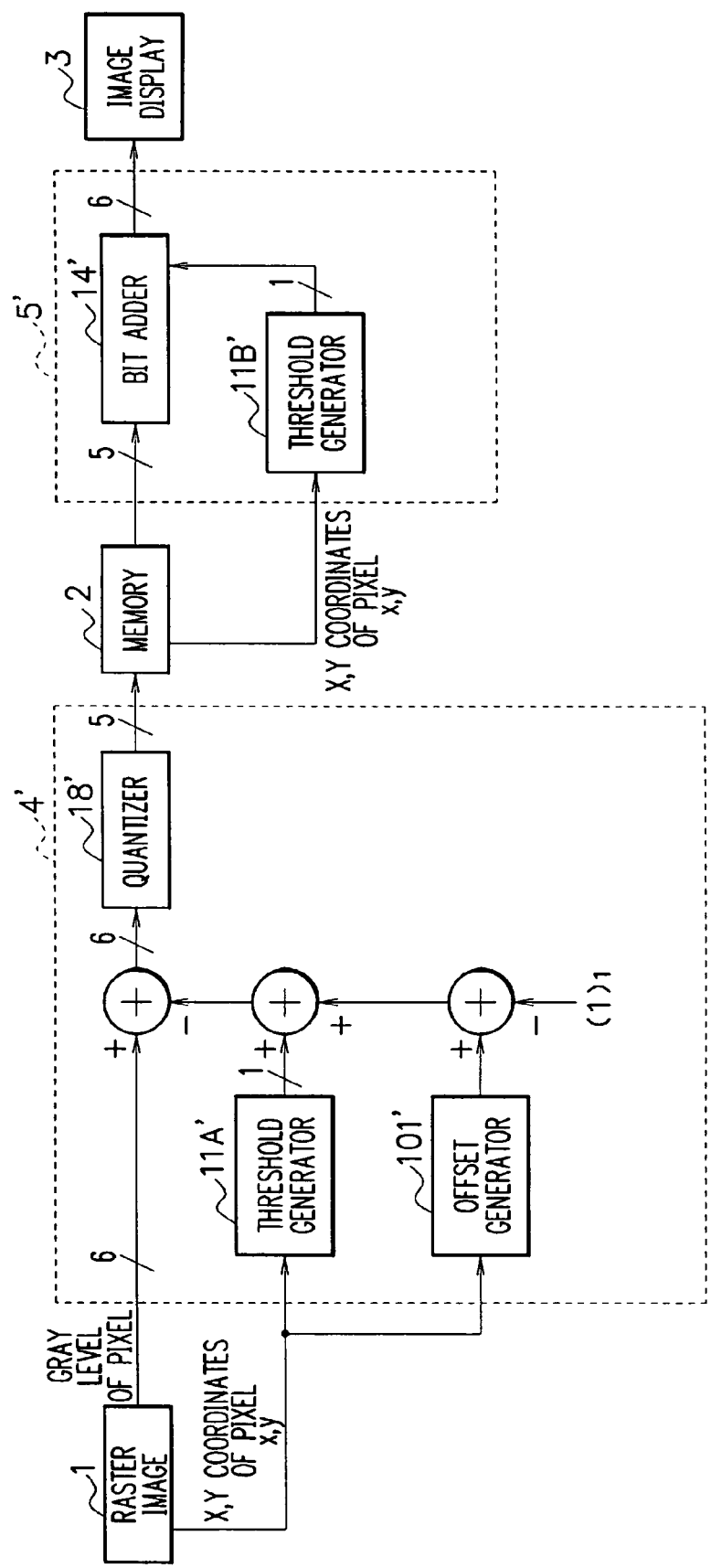
FIG. 42 is a diagram showing the construction of an image processing apparatus according to the ninth embodiment of the present invention.

FIG. 42 is a diagram showing the construction of an image processing apparatus according to the ninth embodiment of the present invention. As can be seen in FIG. 42, in the ninth embodiment, the bit-plane number of a raster image is reduced from 6 bits to 5 bits, and after that, the reduced bit-plane number is increased to 6 bits. The image processing apparatus of this embodiment employs 2×2 matrices shown in FIG. 43 as a threshold matrix and an offset matrix. Besides, a constant offset value is set to "1". A quantizer 18' removes only one low-order bit from a 6-bit signal input therein.

Figure 44:
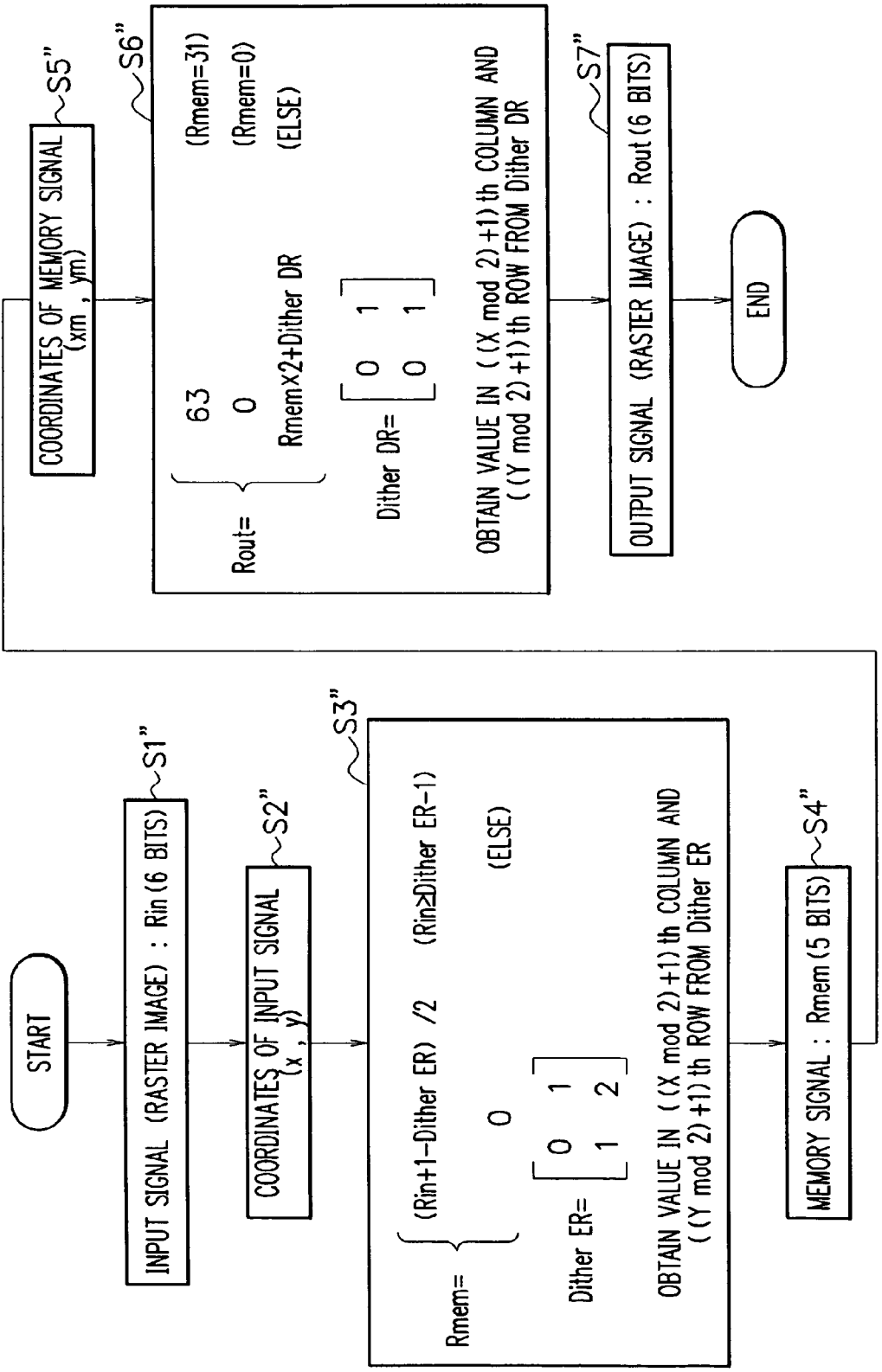
FIG. 44 is a flowchart showing the operation of the image processing apparatus depicted in FIG. 42.
Figure 45:
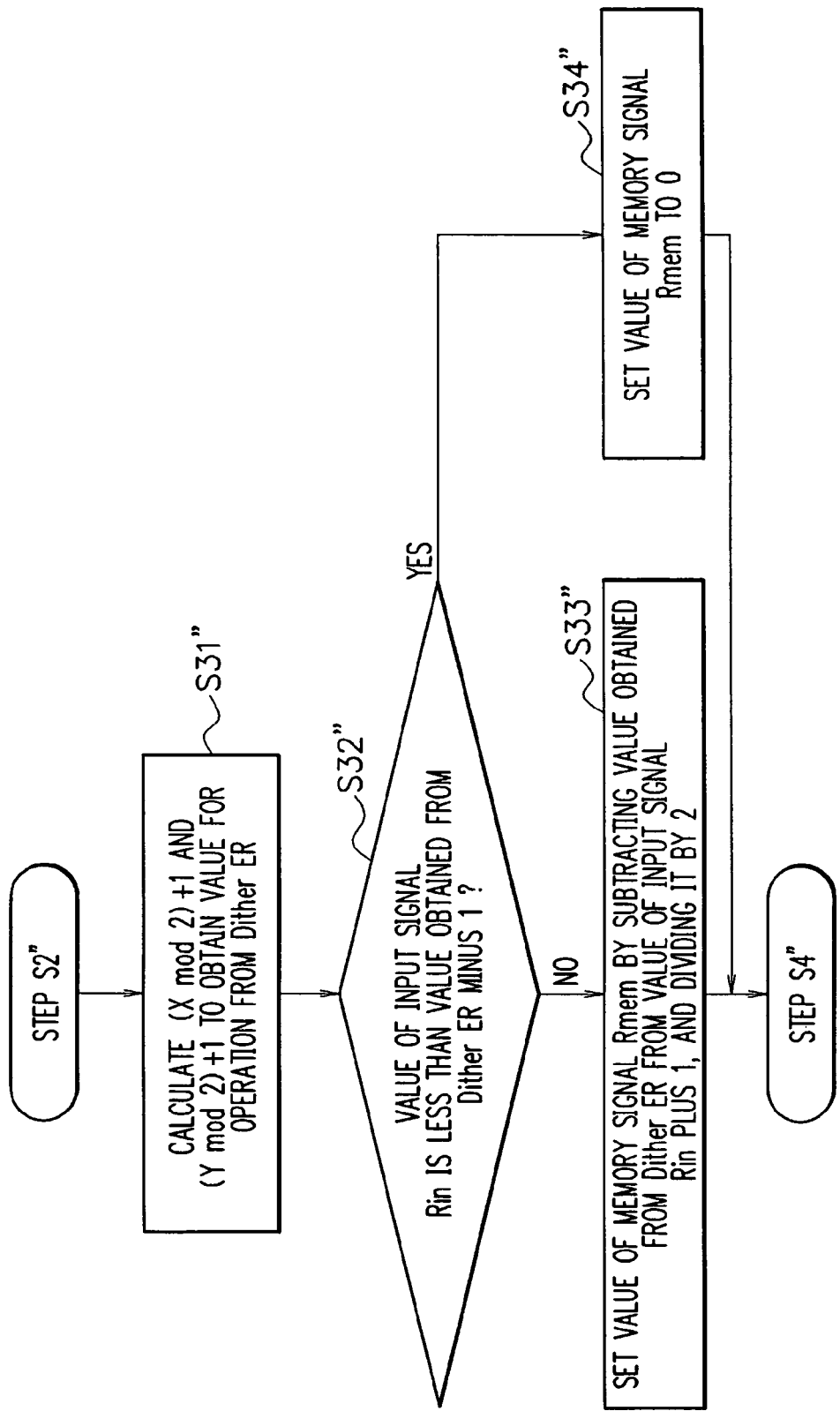
FIG. 45 is a flowchart showing the dithering operation of the image processing apparatus depicted in FIG. 42.
Figure 46:
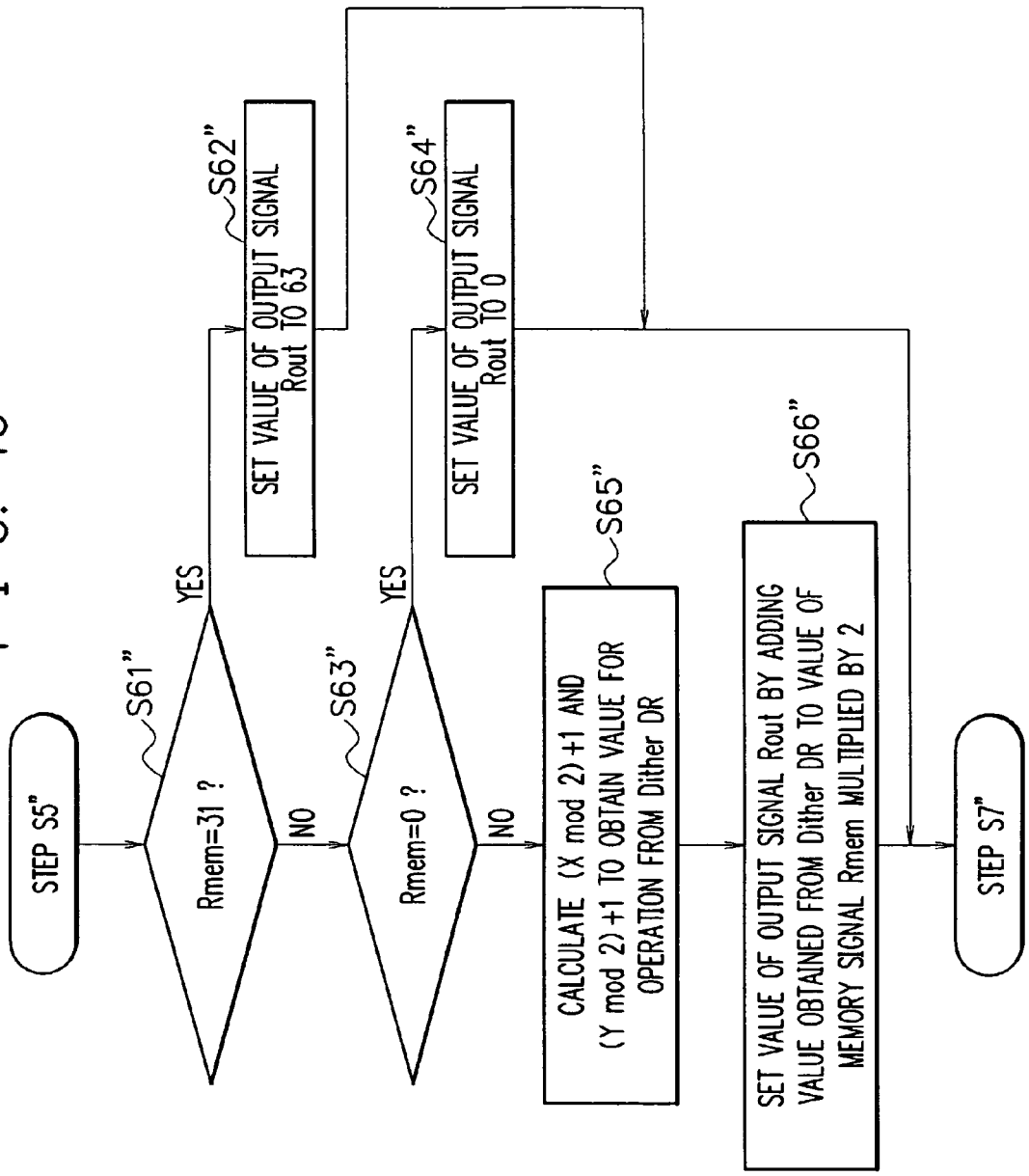
FIG. 46 is a flowchart showing the bit addition operation of the image processing apparatus depicted in FIG. 42.

The image processing performed by the image processing apparatus shown in FIG. 42 may also be implemented by software with the actual use of a computer for a first image processor 4' and a second image processor 5'. FIG. 44 is a flowchart showing the operation of the image processing apparatus in this case. Although there are differences in the sizes of the threshold matrix and the offset matrix and the bit-plane number to be reduced, the operation is basically similar to that shown in FIG. 40. FIG. 45 is a flowchart showing the operation of the first image processor 4' in step S3". FIG. 46 is a flowchart showing the operation of the second image processor 5' in step S6".

The first image processor 4' determines a signal Rmem (5 bits) output to the memory 2 based on the X and Y coordinates of a pixel as follows (step S3"):

The first image processor 4' calculates ((X mod 2)+1) and ((Y mod 2)+1) to obtain a value in the ((X mod 2)+1)th column and the ((Y mod 2)+1)th row from DitherER (the summation matrix of the threshold matrix and the offset matrix shown in FIG. 43) (step S31")

If the value of Rin is equal to or larger than a value obtained by subtracting the constant offset from DitherER (DitherER−1) (step S32"/No), the first image processor 4' subtracts (DitherER−1) from the value of Rin (Rin+1−DitherER), and divides (Rin+1−DitherER) by 2, thus defining the quantized value as the value of Rmem (step S33")

If the value of Rin is less than (DitherER−1) (step S32"/Yes), the first image processor 4 defines 0 (zero) as the value of Rmem (step S34")

The second image processor 5' determines an output signal Rout (6 bits) as follows (step S6'):

If Rmem=31 (step S61"/Yes), Rout=63 (step S62")

If Rmem=0 (step S61"/No, step S63"/Yes), Rout=0 (step S64")

If Rmem≠31 (step S61"/No) and also Rmem≠0 (step S63"/No), the second image processor 5 calculates ((X mod 2)+1) and ((Y mod 2)+1) to obtain a value in the ((X mod 2)+1)th column and the ((Y mod 2)+1)th row from DitherDR (the threshold matrix shown in FIG. 43) (step S65")

The second image processor 5' multiplies the value of Rmem by 2, and adds the value obtained from DitherDR to the multiplied value (step S66")

While, in this embodiment, the bit-plane number is reduced from 6 bits to 5 bits and then increased to 6 bits, the bit-plane numbers before and after processing may be arbitrary numbers so long as the bit-plane number of an original image is once reduced and then increased again by the processing. In other words, if only the relations A>B and B<C are satisfied, where A is the bit-plane number of an original image, B is the bit-plane number of data output from the first image processor, and C is the bit-plane number of data output from the second image processor, A, B and C may be arbitrary numbers.

While the preferred embodiments of the present invention have been described using specific terms, such description is for illustrative purposes only and without limitation.

For example, in the above embodiments, the image processing apparatus has the same constructions for respective colors R, G and B in parallel. However, reduced bit-plane number is not necessarily the same for the colors R, G and B. In the case of image signals of three colors of R, G and B, preferably, the bit-plane number is reduced most for blue, the bit-plane number is reduced second most for red, and the bit-plane number is reduced least for green. This is because human eyes are most sensitive to changes in the shades of green and insensitive to changes in the shades of blue.

Besides, the bit-plane number may be reduced and increased for only one or two colors of R, G and B.

In addition, a raster image is not necessarily a color image formed of image signals of plural colors. A raster image may be a monochrome image. That is, the image processing apparatus does not necessarily have the same constructions as previously described for respective colors R, G and B in parallel.

As set forth hereinabove, in accordance with the present invention, a bitmap image transmitted to the display can be compressed and decompressed with less logic elements. Thus, it is possible to reduce memory capacity and transmission capacity.

Further, the present invention can minimize the distortion or difference between an image which has undergone the bit addition and the original image as compared to conventional image processing techniques. Therefore, it is possible to suppress graininess and false colors seen when there is a large difference between the two images, and achieve high quality image display.

Still further, in the case where the image processing apparatus of the present invention is applied to a display whose drive circuit is formed on a substrate (e.g. a glass substrate), the apparatus can be formed on the substrate by the same process. Therefore, the application of the image processing apparatus enables reductions in the memory space or area and electric power consumption.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An image processing apparatus comprising:
    a first image processor for performing multi-level dithering based on a two-dimensional dither matrix to reduce the bit-plane number of a raster image as an original image;
    a memory for storing image data of the raster image whose bit-plane number has been reduced by the first image processor; and
    a second image processor for performing bit addition for the image data read out from the memory to increase the bit-plane number thereof; wherein:
    the first image processor applies to the multi-level dithering a summation matrix of a threshold matrix and an offset matrix as offset values for minimizing the difference between the signal value of the original image and the average of all the dither values of the raster image whose bit-plane number has been increased; and
    the threshold matrix is obtained by changing matrix values of the two-dimensional dither matrix corresponding to matrix values of the offset matrix not being "0" to values other than their original values, respectively, wherein the two-dimensional dither matrix comprises four areas, wherein each of the four areas comprises n sub-areas each assigned one of n unique dither values ranging from a minimum to a maximum value, wherein n equals 2 raised to the power of a bit-plane number, the bit-plane number being an original bit-plane number of the raster image minus a reduced bit-plane number of the raster image, wherein the offset matrix comprises 2×n "0" values corresponding to the sub-areas of two of the four areas of the two-dimensional dither matrix and 2×n non-zero values corresponding to the remaining sub-areas of the two-dimensional dither matrix, wherein the non-zero values are equal to a specified value.

2. An image processing apparatus claimed in claim 1, wherein the matrix values of the threshold matrix have been changed from their original values in the two-dimensional dither matrix so that the same matrix values are arranged separately in the summation matrix.

3. An image processing apparatus claimed in claim 1, wherein a sequence of two or more matrix values "1" and a sequence of two or more matrix values "0" are alternately arranged in both row and column directions to form a checkered pattern in the offset matrix.

4. An image processing apparatus claimed in claim 3, wherein the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

5. An image processing apparatus claimed in claim 1, wherein the first image processor adds a constant offset matrix corresponding to the number of reduced bit-planes to the offset matrix.

6. An image processing apparatus claimed in claim 5, further comprising a composite matrix generator for generating a composite matrix of the summation matrix and the constant offset matrix.

7. An image processing apparatus claimed in claim 1, further comprising a summation matrix generator for generating the summation matrix of the threshold matrix and the offset matrix.

8. An image processing apparatus claimed in claim 1, wherein:
when the image signal of the raster image after the bit-plane reduction has the maximum gray level, the second image processor sets the gray level of the image signal of the raster image after the bit-plane addition to the maximum gray level; and
when the image signal of the raster image after the bit-plane reduction has the minimum gray level, the second image processor sets the gray level of the image signal of the raster image after the bit-plane addition to the minimum gray level.

9. An image processing apparatus claimed in claim 1, wherein:
the raster image is an RGB color image in which respective R, G and B color signals have the same number of bit-planes; and
the bit-plane number of the B signal is reduced most, while the bit-plane number of the G signal is reduced least.

10. An image processing apparatus claimed in claim 1, wherein:
the raster image is an RGB color image having color components R, G and B; and
the first image processor reduces the bit-plane number of at least one of the color components, and thereafter, the second image processor increases the bit-plane number reduced by the first image processor.

11. An image processing apparatus claimed in claim 1, wherein the second image processor performs the bit addition based on the threshold matrix.

12. An image transmission apparatus comprising:
a first unit for performing multi-level dithering based on a two-dimensional dither matrix to reduce the bit-plane number of a raster image as an original image; and
a second unit for performing bit addition for the raster image whose bit-plane number has been reduced by the first unit to increase the bit-plane number; wherein:
the first unit sends the raster image with less bit-plane number to the second unit;
the first unit applies to the multi-level dithering a summation matrix of a threshold matrix and an offset matrix as offset values for minimizing the difference between the gray level of the original image and the average of all the dither values of the raster image whose bit-plane number has been increased; and
the threshold matrix is obtained by changing matrix values of the two-dimensional dither matrix corresponding to matrix values of the offset matrix not being "0" to values other than their original values, respectively,
wherein the two-dimensional dither matrix comprises four areas, wherein each of the four areas comprises n sub-areas each assigned one of n unique dither values ranging from a minimum to a maximum value, wherein n equals 2 raised to the power of a bit-plane number, the bit-plane number being an original bit-plane number of the raster image minus a reduced bit-plane number of the raster image,
wherein the offset matrix comprises 2×n "0" values corresponding to the sub-areas of two of the four areas of the two-dimensional dither matrix and 2×n non-zero values corresponding to the remaining sub-areas of the two-dimensional dither matrix, wherein the non-zero values are equal to a specified value.

13. An image transmission apparatus claimed in claim 12, wherein the matrix values of the threshold matrix have been changed from their original values in the two-dimensional dither matrix so that the same matrix values are arranged separately in the summation matrix.

14. An image transmission apparatus claimed in claim 12, wherein a sequence of two or more matrix values "1" and a sequence of two or more matrix values "0" are alternately arranged in both row and column directions to form a checkered pattern in the offset matrix.

15. An image transmission apparatus claimed in claim 14, wherein the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

16. An image transmission apparatus claimed in claim 12, wherein the first unit adds a constant offset matrix corresponding to the number of reduced bit-planes to the offset matrix.

17. An image transmission apparatus claimed in claim 16, wherein the first unit includes a composite matrix generator for generating a composite matrix of the summation matrix and the constant offset matrix.

18. An image transmission apparatus claimed in claim 12, wherein the first unit includes a summation matrix generator for generating the summation matrix of the threshold matrix and the offset matrix.

19. An image transmission apparatus claimed in claim 12, wherein:
when the image signal of the raster image after the bit-plane reduction has the maximum gray level, the second unit sets the gray level of the image signal of the raster image after the bit-plane addition to the maximum gray level; and
when the image signal of the raster image after the bit-plane reduction has the minimum gray level, the second unit sets the gray level of the image signal of the raster image after the bit-plane addition to the minimum gray level.

20. An image transmission apparatus claimed in claim 12, wherein:
the raster image is an RGB color image in which respective R, G and B color signals have the same number of bit-planes; and
the bit-plane number of the B signal is reduced most, while the bit-plane number of the G signal is reduced least.

21. An image transmission apparatus claimed in claim 12, wherein the raster image is an RGB color image having color components R, G and B; and
the first unit reduces the bit-plane number of at least one of the color components, and thereafter, the second unit increases the bit-plane number reduced by the first unit.

22. An image transmission apparatus claimed in claim 12, wherein the second unit performs the bit addition based on the threshold matrix.

23. A display comprising:
a first image processor for performing multi-level dithering based on a two-dimensional dither matrix to reduce the bit-plane number of a raster image as an original image;
a memory for storing image data of the raster image whose bit-plane number has been reduced by the first image processor;
a second image processor for performing bit addition for the image data read out from the memory to increase the bit-plane number thereof; and
an image display for displaying an image corresponding to the image data whose bit-plane number has been increased by the second image processor; wherein:
the first image processor applies to the multi-level dithering a summation matrix of a threshold matrix and an offset matrix as offset values for minimizing the difference between the signal value of the original image and the average of all the dither values of the raster image whose bit-plane number has been increased; and
the threshold matrix is obtained by changing matrix values of the two-dimensional dither matrix corresponding to matrix values of the offset matrix not being "0" to values other than their original values, respectively,
wherein the two-dimensional dither matrix comprises four areas, wherein each of the four areas comprises n sub-areas each assigned one of n unique dither values ranging from a minimum to a maximum value, wherein n equals 2 raised to the power of a bit-plane number, the bit-plane number being an original bit-plane number of the raster image minus a reduced bit-plane number of the raster image,
wherein the offset matrix comprises 2×n "0" values corresponding to the sub-areas of two of the four areas of the two-dimensional dither matrix and 2×n non-zero values corresponding to the remaining sub-areas of the two-dimensional dither matrix, wherein the non-zero values are equal to a specified value.

24. A display claimed in claim 23, wherein the matrix values of the threshold matrix have been changed from their original values in the two-dimensional dither matrix so that the same matrix values are arranged separately in the summation matrix.

25. A display claimed in claim 23, wherein a sequence of two or more matrix values "1" and a sequence of two or more matrix values "0" are alternately arranged in both row and column directions to form a checkered pattern in the offset matrix.

26. A display claimed in claim 25, wherein the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

27. A display claimed in claim 23, wherein the first image processor adds a constant offset matrix corresponding to the number of reduced bit-planes to the offset matrix.

28. A display claimed in claim 27, further comprising a composite matrix generator for generating a composite matrix of the summation matrix and the constant offset matrix.

29. A display claimed in claim 23, further comprising a summation matrix generator for generating the summation matrix of the threshold matrix and the offset matrix.

30. A display claimed in claim 23, wherein:
when the image signal of the raster image after the bit-plane reduction has the maximum gray level, the second image processor sets the gray level of the image signal of the raster image after the bit-plane addition to the maximum gray level; and
when the image signal of the raster image after the bit-plane reduction has the minimum gray level, the second image processor sets the gray level of the image signal of the raster image after the bit-plane addition to the minimum gray level.

31. A display claimed in claim 23, wherein:
the raster image is an RGB color image in which respective R, G and B color signals have the same number of bit-planes; and
the bit-plane number of the B signal is reduced most, while the bit-plane number of the G signal is reduced least.

32. A display claimed in claim 23:
wherein the raster image is an RGB color image having color components R, G and B; and
the first image processor reduces the bit-plane number of at least one of the color components, and thereafter, the second image processor increases the bit-plane number reduced by the first image processor.

33. A display claimed in claim 23, wherein the second image processor performs the bit addition based on the threshold matrix.

34. A display claimed in claim 23, comprising a plurality of the second image processors for respective pixels on one line in the main scanning direction of the image display, wherein image data with respect to one line in the main scanning direction of the image display are output all at once to the second image processors corresponding to respective pixels on the line.

35. A display claimed in claim 34, further comprising an all threshold generator for generating threshold values used for the bit addition by the respective second image processors all at once to output the threshold values to the second image processors, respectively.

36. A display claimed in claim 23, wherein the second image processor is formed on the same substrate where the drive circuit of the display is formed.

37. A display claimed in claim 23, wherein the first image processor is formed on the same substrate where the drive circuit of the display is formed.

38. An image processing method comprising the steps of:
performing as first image processing multi-level dithering based on a two-dimensional dither matrix to reduce the bit-plane number of a raster image as an original image;
storing image data of the raster image whose bit-plane number has been reduced in a memory; and
performing as second image processing bit addition for the image data read out from the memory to increase the bit-plane number thereof; wherein:
in the first image processing, to the multi-level dithering is applied a summation matrix of a threshold matrix and an offset matrix as offset values for minimizing the difference between the signal value of the original image and the average of all the dither values of the raster image whose bit-plane number has been increased; and
the threshold matrix is obtained by changing matrix values of the two-dimensional dither matrix corresponding to matrix values of the offset matrix not being "0" to values other than their original values, respectively,
wherein the two-dimensional dither matrix comprises four areas, wherein each of the four areas comprises n sub-areas each assigned one of n unique dither values ranging from a minimum to a maximum value, wherein n equals 2 raised to the power of a bit-plane number, the bit-plane number being an original bit-plane number of the raster image minus a reduced bit-plane number of the raster image,
wherein the offset matrix comprises 2×n "0" values corresponding to the sub-areas of two of the four areas of the two-dimensional dither matrix and 2×n non-zero values corresponding to the remaining sub-areas of the two-dimensional dither matrix, wherein the non-zero values are equal to a specified value.

39. An image processing method claimed in claim 38, wherein the matrix values of the threshold matrix have been changed from their original values in the two-dimensional dither matrix so that the same matrix values are arranged separately in the summation matrix.

40. An image processing method claimed in claim 38, wherein a sequence of two or more matrix values "1" and a sequence of two or more matrix values "0" are alternately arranged in both row and column directions to form a checkered pattern in the offset matrix.

41. An image processing method claimed in claim 40, wherein the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

42. An image processing method claimed in claim 38, wherein, in the first image processing, a constant offset matrix corresponding to the number of reduced bit-planes is added to the offset matrix.

43. An image processing method claimed in claim 38, wherein:
in the second image processing, when the image signal of the raster image after the bit-plane reduction has the maximum gray level, the gray level of the image signal of the raster image after the bit-plane addition is set to the maximum gray level; and
when the image signal of the raster image after the bit-plane reduction has the minimum gray level, the gray level of the image signal of the raster image after the bit-plane addition is set to the minimum gray level.

44. An image processing method claimed in claim 38, wherein:
the raster image is an RGB color image in which respective R, G and B color signals have the same number of bit-planes; and
the bit-plane number of the B signal is reduced most, while the bit-plane number of the G signal is reduced least.

45. An image processing method claimed in claim 38, wherein:
the raster image is an RGB color image having color components R, G and B; and
the bit-plane number of at least one of the color components is reduced in the first image processing, and thereafter, the bit-plane number reduced by the first image processing is increased in the second image processing.

46. An image processing method claimed in claim 38, wherein, in the second image processing, the bit addition is performed based on the threshold matrix.

47. An image transmission method comprising the steps of:
performing, by a first unit, multi-level dithering based on a two-dimensional dither matrix to reduce the bit-plane number of a raster image as an original image;
sending the raster image with less bit-plane number from the first unit to a second unit; and
performing, by the second unit, bit addition for the raster image whose bit-plane number has been reduced by the first unit to increase the bit-plane number; wherein:
the first unit applies to the multi-level dithering a summation matrix of a threshold matrix and an offset matrix as offset values for minimizing the difference between the gray level of the original image and the average of all the dither values of the raster image whose bit-plane number has been increased; and
the threshold matrix is obtained by changing matrix values of the two-dimensional dither matrix corresponding to matrix values of the offset matrix not being "0" to values other than their original values, respectively,
wherein the two-dimensional dither matrix comprises four areas, wherein each of the four areas comprises n sub-areas each assigned one of n unique dither values ranging from a minimum to a maximum value, wherein n equals 2 raised to the power of a bit-plane number, the bit-plane number being an original bit-plane number of the raster image minus a reduced bit-plane number of the raster image,
wherein the offset matrix comprises 2×n "0" values corresponding to the sub-areas of two of the four areas of the two-dimensional dither matrix and 2×n non-zero values corresponding to the remaining sub-areas of the two-dimensional dither matrix, wherein the non-zero values are equal to a specified value.

48. An image transmission method claimed in claim 47, wherein the matrix values of the threshold matrix have been changed from their original values in the two-dimensional dither matrix so that the same matrix values are arranged separately in the summation matrix.

49. An image transmission method claimed in claim 47, wherein a sequence of two or more matrix values "1" and a sequence of two or more matrix values "0" are alternately arranged in both row and column directions to form a checkered pattern in the offset matrix.

50. An image transmission method claimed in claim 49, wherein the matrix values of the threshold matrix have been changed to values other than their original values in such a manner that a matrix value corresponding to a matrix value "1" of the offset matrix is reduced by 1 when its original value is not 0 or increased to the maximum value when its original value is 0.

51. An image transmission method claimed in claim 47, wherein the first unit adds a constant offset matrix corresponding to the number of reduced bit-planes to the offset matrix.

52. An image transmission method claimed in claim 47, wherein:
   when the image signal of the raster image after the bit-plane reduction has the maximum gray level, the second unit sets the gray level of the image signal of the raster image after the bit-plane addition to the maximum gray level; and
   when the image signal of the raster image after the bit-plane reduction has the minimum gray level, the second unit sets the gray level of the image signal of the raster image after the bit-plane addition to the minimum gray level.

53. An image transmission method claimed in claim 47, wherein:
   the raster image is an RGB color image in which respective R, G and B color signals have the same number of bit-planes; and
   the bit-plane number of the B signal is reduced most, while the bit-plane number of the G signal is reduced least.

54. An image transmission method claimed in claim 47, wherein:
   the raster image is an RGB color image having color components R, G and B; and
   the first unit reduces the bit-plane number of at least one of the color components, and thereafter, the second unit increases the bit-plane number reduced by the first unit.

55. An image transmission method claimed in claim 47, wherein the second unit performs the bit addition based on the threshold matrix.

* * * * *